US008616969B2

(12) United States Patent
Thomas

(10) Patent No.: US 8,616,969 B2
(45) Date of Patent: Dec. 31, 2013

(54) GAMING MACHINE WITH LED DISPLAY THAT IS AN INTEGRAL PART OF GAME PLAY

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1822 days.

(21) Appl. No.: 11/265,763

(22) Filed: Nov. 2, 2005

(65) Prior Publication Data

US 2006/0128467 A1 Jun. 15, 2006

Related U.S. Application Data

(60) Provisional application No. 60/624,298, filed on Nov. 2, 2004.

(51) Int. Cl.
*A63F 13/00* (2006.01)

(52) U.S. Cl.
USPC .................. 463/31; 463/30; 463/46; 463/47; 273/142 B; 273/138.2

(58) Field of Classification Search
USPC ............ 273/138.2, 142 B; 463/30–31, 46–47
See application file for complete search history.

(56) References Cited

U.S. PATENT DOCUMENTS

| | | | | |
|---|---|---|---|---|
| 5,038,142 | A * | 8/1991 | Flower et al. | 341/34 |
| 5,215,311 | A * | 6/1993 | Schuller | 463/9 |
| 5,508,720 | A | 4/1996 | DiSanto et al. | |
| 6,004,207 | A | 12/1999 | Wilson, Jr. et al. | |
| 6,155,925 | A | 12/2000 | Giobbi et al. | |
| 6,159,097 | A | 12/2000 | Gura | |
| 6,159,098 | A | 12/2000 | Slomiany et al. | |
| 6,190,255 | B1 | 2/2001 | Thomas et al. | |
| 6,203,429 | B1 | 3/2001 | Demar et al. | |
| 6,234,897 | B1 | 5/2001 | Frohm et al. | |
| 6,270,411 | B1 | 8/2001 | Gura et al. | |
| 6,315,660 | B1 | 11/2001 | DeMar et al. | |
| 6,347,996 | B1 | 2/2002 | Gilmore et al. | |
| 6,358,147 | B1 | 3/2002 | Jaffe et al. | |
| 6,364,314 | B1 | 4/2002 | Canterbury | |
| 6,364,766 | B1 | 4/2002 | Anderson et al. | |
| 6,428,412 | B1 | 8/2002 | Anderson et al. | |
| 6,443,837 | B1 | 9/2002 | Jaffe et al. | |
| 6,506,114 | B1 | 1/2003 | Estes et al. | |

(Continued)

OTHER PUBLICATIONS

"U.S. Appl. No. 10/704,221, Preliminary Amendment mailed Jun. 12, 2007", 18 pgs.

(Continued)

*Primary Examiner* — Dmitry Suhol
*Assistant Examiner* — David Duffy
(74) *Attorney, Agent, or Firm* — Schwegman, Lundberg & Woessner, P.A.

(57) ABSTRACT

An embodiment of a gaming machine has at least two gaming states; and an LED (light emitting diode) display having at least one of two colors respectively associated with the at least two gaming states. The at least two colors may be esthetic or mood producing colors that increase game play. The LED display may emit a color of the at least two colors that is associated with a current gaming state of the at least two gaming states. The LED display may emit a color of the at least two colors or an animation that may be part of the current game play of the gaming machine.

17 Claims, 25 Drawing Sheets

(56) References Cited

U.S. PATENT DOCUMENTS

| | | | | |
|---|---|---|---|---|
| 6,517,432 | B1 | 2/2003 | Jaffe | |
| 6,517,437 | B1 | 2/2003 | Wells et al. | |
| 6,551,187 | B1 | 4/2003 | Jaffe | |
| 6,554,704 | B2 | 4/2003 | Nicastro et al. | |
| 6,561,904 | B2 | 5/2003 | Locke et al. | |
| 6,589,114 | B2 | 7/2003 | Rose | |
| 6,592,457 | B1 | 7/2003 | Frohm et al. | |
| 6,607,437 | B2 | 8/2003 | Casey et al. | |
| 6,683,665 | B1 * | 1/2004 | Matthies | 349/73 |
| 6,811,273 | B2 * | 11/2004 | Satoh et al. | 362/27 |
| 6,817,946 | B2 * | 11/2004 | Motegi et al. | 463/31 |
| 6,893,345 | B2 * | 5/2005 | Motegi et al. | 463/31 |
| 7,219,893 | B2 | 5/2007 | Tanimura et al. | |
| 7,281,980 | B2 * | 10/2007 | Okada | 463/20 |
| 7,335,101 | B1 * | 2/2008 | Luciano, Jr. | 463/16 |
| 7,422,523 | B2 | 9/2008 | Wood | |
| 7,510,475 | B2 | 3/2009 | Loose et al. | |
| 7,857,700 | B2 | 12/2010 | Wilder et al. | |
| 7,892,094 | B2 | 2/2011 | Tanimura et al. | |
| 7,972,206 | B2 | 7/2011 | Okada | |
| 8,287,374 | B2 | 10/2012 | Pryor | |
| 8,408,998 | B2 | 4/2013 | Rasmussen et al. | |
| 2001/0031658 | A1 | 10/2001 | Ozaki et al. | |
| 2002/0039919 | A1 | 4/2002 | Joshi et al. | |
| 2002/0175466 | A1 | 11/2002 | Loose et al. | |
| 2003/0094760 | A1 | 5/2003 | Motegi et al. | |
| 2003/0119577 | A1 | 6/2003 | Motegi et al. | |
| 2003/0176214 | A1 | 9/2003 | Burak et al. | |
| 2004/0048646 | A1 * | 3/2004 | Visocnik | 463/16 |
| 2004/0062025 | A1 * | 4/2004 | Satoh et al. | 362/27 |
| 2004/0166926 | A1 * | 8/2004 | Adachi et al. | 463/20 |
| 2004/0219968 | A1 | 11/2004 | Fiden et al. | |
| 2004/0224758 | A1 * | 11/2004 | Okada et al. | 463/31 |
| 2004/0229686 | A1 | 11/2004 | Tanimura et al. | |
| 2005/0049046 | A1 * | 3/2005 | Kobayashi | 463/31 |
| 2005/0159211 | A1 * | 7/2005 | Englman | 463/25 |
| 2006/0128467 | A1 | 6/2006 | Thomas | |
| 2007/0202948 | A1 * | 8/2007 | Muir et al. | 463/31 |
| 2008/0096655 | A1 | 4/2008 | Rasmussen et al. | |

OTHER PUBLICATIONS

"U.S. Appl. No. 10/704,221, Preliminary Amendment mailed Nov. 10, 2004", 6 pgs.

"U.S. Appl. No. 10/704,221, Restriction Requirement mailed Sep. 28, 2007", 5 pgs.

"U.S. Appl. No. 11/576,126, Examiner Interview Summary mailed Apr. 6, 2012", 3 pgs.

"U.S. Appl. No. 11/576,126, Final Office Action mailed Jun. 15, 2012", 12 pgs.

"U.S. Appl. No. 11/576,126, Non Final Office Action mailed Oct. 18, 2011", 13 pgs.

"U.S. Appl. No. 11/576,126, Response filed Apr. 10, 2012 to Non Final Office Action mailed Oct. 18, 2011", 15 pgs.

"Backlights", About backlights, http://www.backlights.cn/e-aboutlight.htm, (Mar. 25, 2004), 1-2.

"Jinghua-displays.com", About LCD Panel, Http://www.jinghua-displays.com/english/about-lcd.htm, (May 23, 2003), 1-5.

"Point to Point", IGT Introduces new Reel Touch Machines, vol. 10, (Mar. 2004), 1-6.

"Repairfaq.org", LCD (theory) FAQ, http://www.repairfaq.org/filipg/LINK/F_Theory_LCD2.html, (Feb. 13, 2003), 1-4.

"Sharp Laboratories of Europe, Ltd.", 2D/3D Switchable Displays, (Jan. 14, 2003), 1-5.

"U.S. Appl. No. 11/576,126, Examiner Interview Summary mailed Oct. 29, 2012", 3 pgs.

"U.S. Appl. No. 11/576,126, Notice of Allowance mailed Dec. 3, 2012", 9 pgs.

"U.S. Appl. No. 11/576,126, Preliminary Amendment filed Mar. 27, 2007", 8 pgs.

"U.S. Appl. No. 11/576,126, Response filed Nov. 15, 2012 to Final Office Action mailed Jun. 15, 2012", 14 pgs.

* cited by examiner

*FIG.* 21

GAMING MACHINE WITH LED DISPLAY THAT IS AN INTEGRAL PART OF GAME PLAY

RELATED APPLICATION

This application claims priority under 35 U.S.C. 119(e) from U.S. Provisional Application Ser. No. 60/624,298 filed 2 Nov. 2004, which application is incorporated herein by reference.

FIELD

The present invention relates generally to gaming machines and, more particularly, to a gaming machine with an LED (light emitting diode) display.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001-2005, WMS Gaming, Inc. All Rights Reserved.

BACKGROUND

A reel spinning slot machine generally comprises a plurality of mechanical rotatable reels controlled by a processor. In response to a wager, the processor randomly selects an outcome from a plurality of possible outcomes and then causes the reels to be rotated and stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

Heretofore, the display area of reel spinning slot machines has been fairly mundane. Any proposals for changing the appearance of the display area have been fairly minor and limited in capability. For example, in U.S. Pat. No. 6,056,642 to Bennett, reel symbols are colored by backlighting the symbols with colored light bulbs or similar means. In U.S. Pat. No. 6,027,115 to Griswold et al., the reels themselves contain electroluminescent elements that define one or more reel symbols, such as cherries, bars, a number "7," etc. If multiple electroluminescent elements are provided for a particular symbol, that symbol may be displayed in multiple formats. Although the above proposals change the appearance of the display area to some extent, a need exists for a structure capable of effecting more extravagant changes to the appearance of the display area.

As a result, there is a need in the art for an improve displays for gaming machines.

SUMMARY

The above-mentioned shortcomings, disadvantages and problems are addressed by embodiments of the present method and apparatus, which will be understood by reading and studying the following specification.

Accordingly, an embodiment of a gaming machine has: at least two gaming states; and an LED (light emitting diode) display having at least one of two colors respectively associated with the at least two gaming states. The at least two colors may be esthetic or mood producing colors that increase game play. The LED display may emit a color of the at least two colors that is associated with a current gaming state of the at least two gaming states. The LED display may emit a color of the at least two colors or an animation that may be part of the current game play of the gaming machine.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The foregoing and other advantages of the invention will become apparent upon reading the following detailed description and upon reference to the drawings.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as “processing” or “computing” or “calculating” or “determining” or “displaying” or the like, refer to the action and processes of a computer system, or similar computing device, that manipulates and transforms data represented as physical (e.g., electronic) quantities within the computer system’s registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Figure 1A:
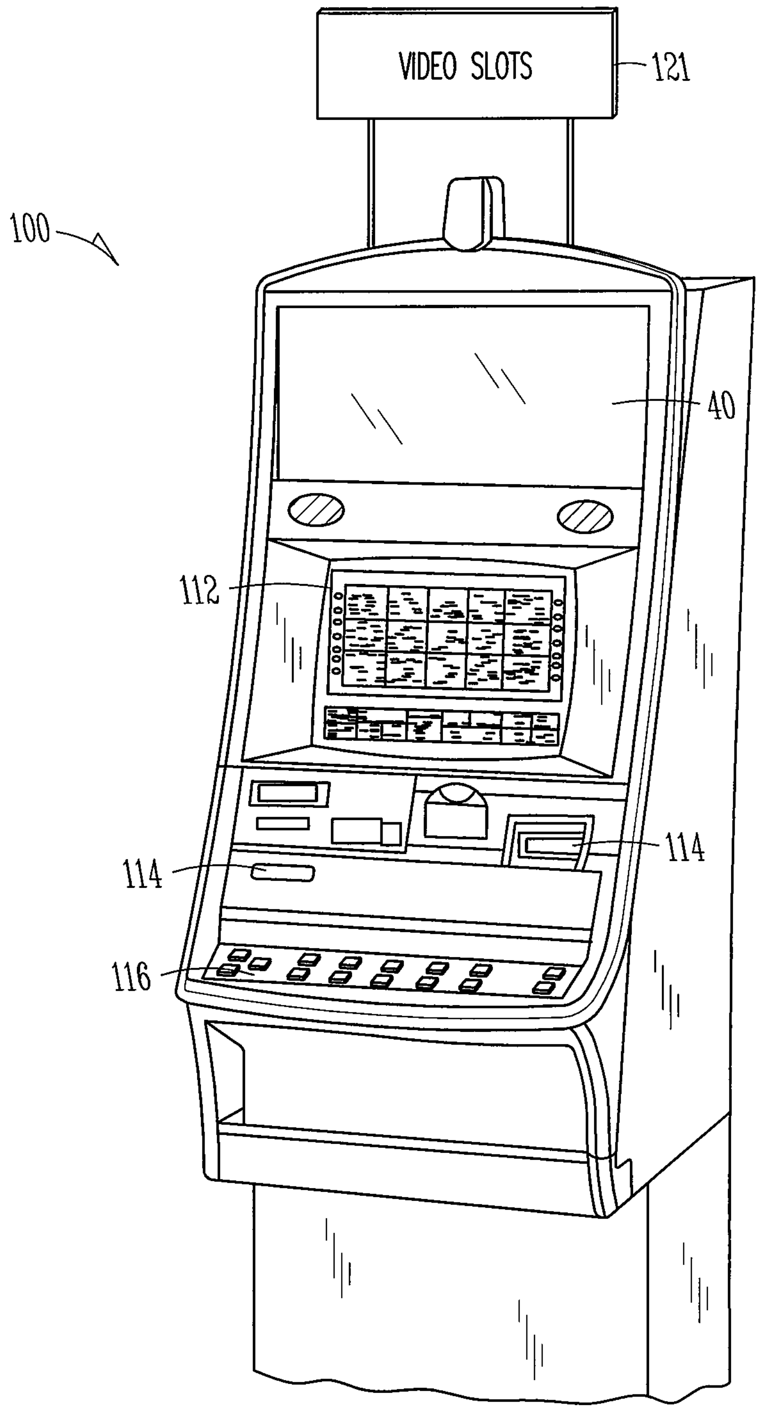
FIG. 1A is a perspective view of a gaming machine embodying the present invention.

FIG. 1*a* illustrates an exemplary gaming machine 100 in which embodiments of the invention may be implemented. In some embodiments, gaming machine 100 is operable to conduct a wagering game. These wagering games may include reel based wagering games such as mechanical or video slots, card based games such as video poker, or other types of wagering games such as video keno, video bingo or a video dice game (e.g. a Yahtzee® like dice game). If based in video, the gaming machine 100 includes a video display 112 such as a cathode ray tube (CRT), liquid crystal display (LCD), plasma, or other type of video display known in the art. In the illustrated embodiment, the gaming machine 100 is an “upright” version in which the display 112 is oriented vertically relative to a player. Alternatively, the gaming machine may be a “slant-top” version in which the display 112 is slanted at about a thirty-degree angle toward the player.

The gaming machine 100 includes a plurality of possible credit receiving mechanisms 114 for receiving credits to be used for placing wagers in the game. The credit receiving mechanisms 114 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 100 includes a user interface comprising a plurality of push-buttons 116, and other possible devices. The plurality of push-buttons 116 may, for example, include one or more “bet” buttons for wagering, a “play” button for commencing play, a “collect” button for cashing out, a help” button for viewing a help screen, a “pay table” button for viewing the pay table(s), and a “call attendant” button for calling an attendant. Additional game specific buttons may be provided to facilitate play of the specific game executed on the machine. A touch screen may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

In some embodiments, gaming machine 100 includes a top box 40. Top box 40 may contain a video display, a mechanical display, or a diorama display that supplements display 112. For example, the display in top box 40 may be a wheel such as a rotating wheel, mechanical dice, a board for a board game, or other such display.

A processor controls operation of the gaming machine 100. In response to receiving a wager and a command to initiate play, the processor randomly selects a game outcome from a plurality of possible outcomes and causes the display 112 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome. In some embodiments, gaming machine 100 may include signage 121.

Figure 1B:
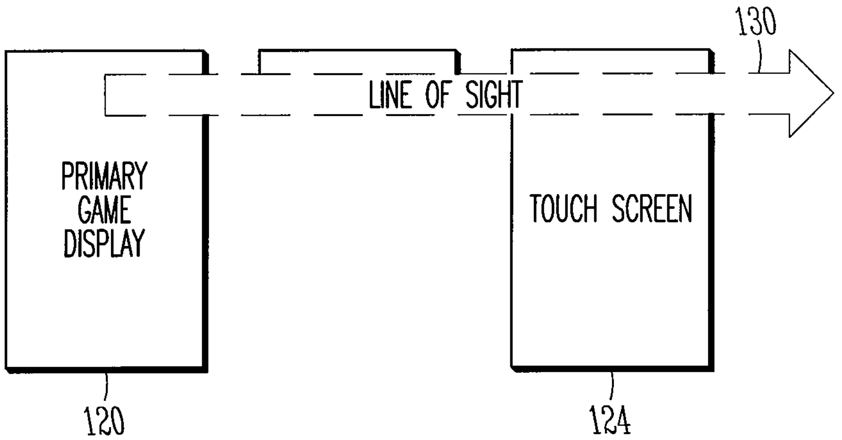
FIG. 1B is a side view of a game display according to embodiments of the invention.

FIG. 1*b* is a side view of a game display according to embodiments of the invention and illustrates further details of the display 112. In some embodiments, display 112 includes a primary game display 120. In some embodiments, primary game display 120 may be a mechanical display, such as a plurality of reels for a slot machine (described further below), a wheel, including a roulette wheel, one or more dice, a pachinko board, or other board game. No embodiment of the invention is limited to any particular mechanical display. In alternative embodiments, primary game display may be a video based display such as a CRT or LCD. In further alternative embodiments, primary game display 120 may be a diorama presenting a three-dimensional model for a game environment. In some implementations the diorama may be stationary, while in other implementations the diorama may slide or move in one or more dimensions.

Figure 1C:
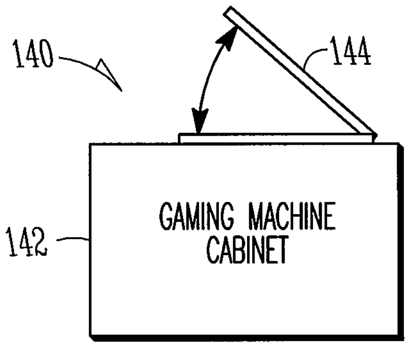
FIG. 1C is an isometric view of a spinning reel slot machine embodying the present invention.

FIG. 1*c* is a side view illustrating a gaming machine 140 according to alternative embodiments of the invention. In some embodiments, a gaming machine cabinet 142 houses components of a gaming machine such as a processor and memory that control the operation of the gaming machine. A game display 144 is coupled to the processor of the gaming machine, and may be rotatably mounted to game machine cabinet 142. In some embodiments, game display 144 is placed in a substantially horizontal position when not in use, and is rotated to a non-horizontal position when a player desires to play a wagering game.

Figure 1D:
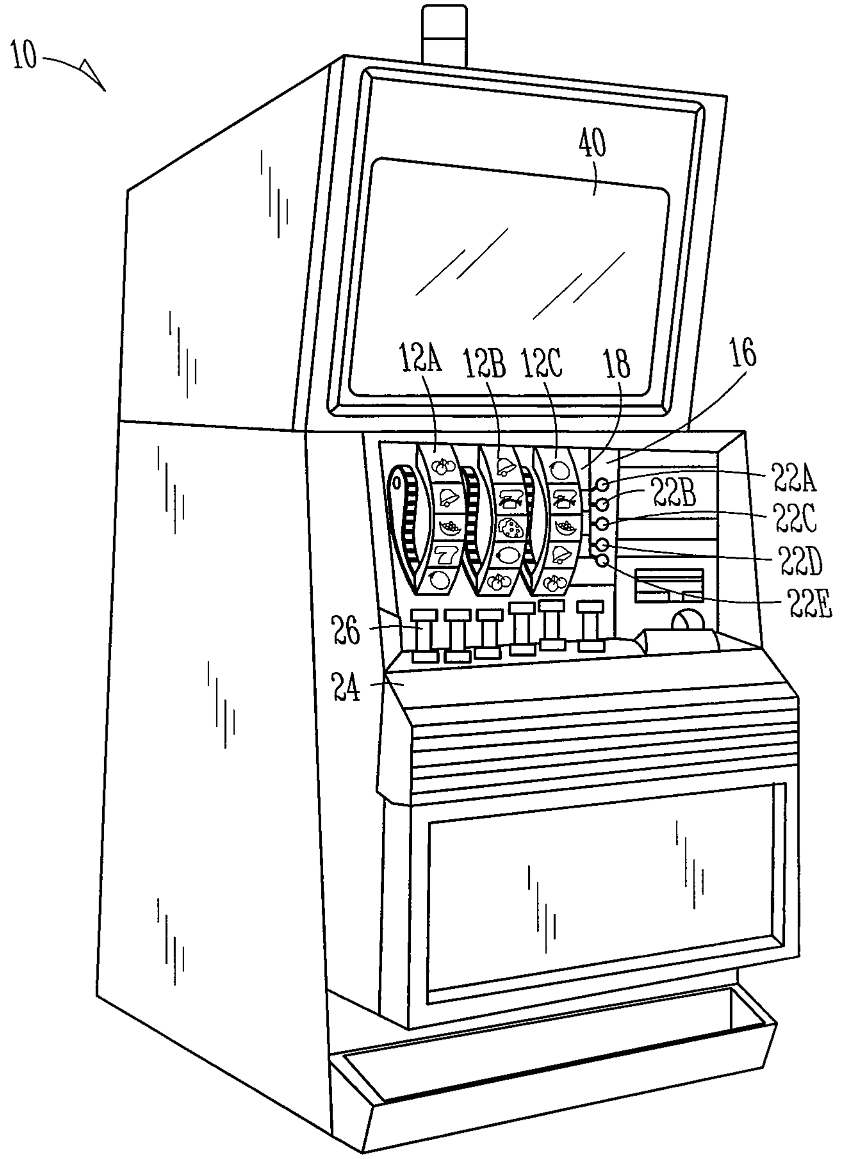
FIG. 1D is a side view of a gaming machine according to alternative embodiments of the invention.
Figure 2A:
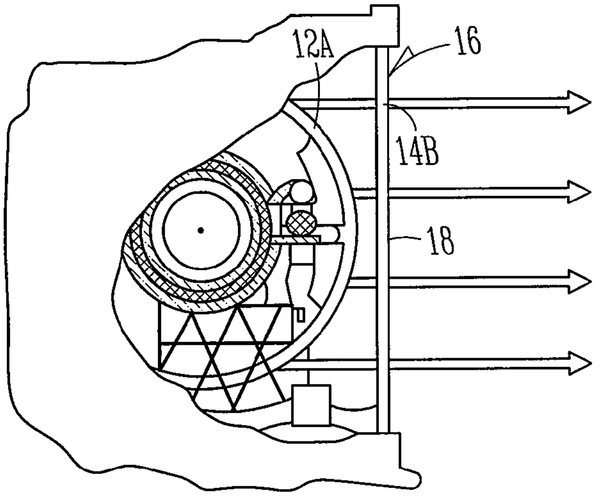
FIG. 2A is a side view of a slot machine embodiment with portions broken away to reveal internal structure in accordance with embodiments of the present invention.
Figure 2B:
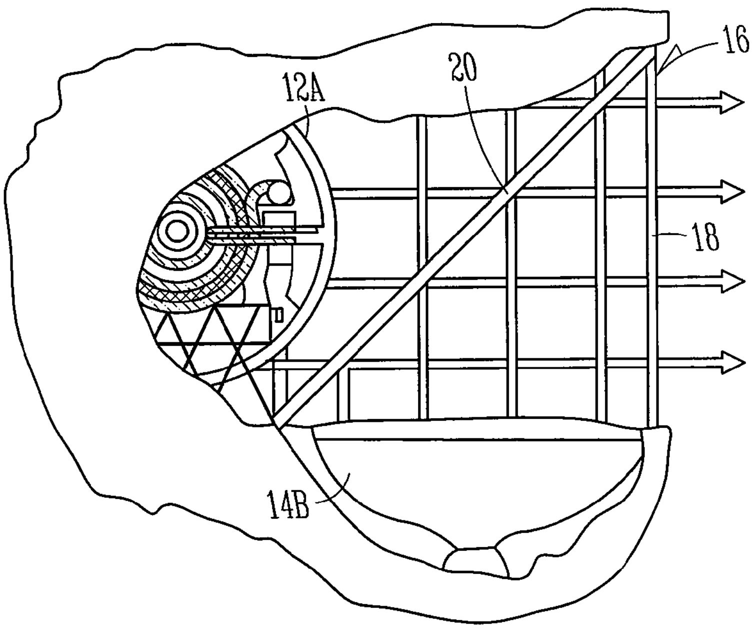
FIG. 2B is a side view of a slot machine embodiment with portions broken away to reveal internal structure in accordance with alternative embodiments of the present invention.

FIG. 1*d* illustrates an embodiment of the invention where the primary game display comprises a spinning reel slot machine 10 that includes a plurality of mechanical rotatable reels 12*a*, 12*b*, 12*c* and a video display (see FIGS. 2*a* and 2*b*). In response to a wager, the reels 12*a*, 12*b*, 12*c* are rotated and stopped to randomly place symbols on the reels in visual association with a display area 16. Payouts are awarded based on combinations and arrangements of the symbols appearing in the display area 16. The video display provides a video image 18 occupying the display area 16 and superimposed on the reels 12*a*, 12*b*, 12*c*. The video image 18 may be interactive with the reels 12*a*, 12*b*, 12*c*, may be static or dynamic, and may include such graphics as payout values, a pay table, pay lines, bonus game features, special effects, thematic scenery, and instructional information. In the illustrated embodiment, the slot machine 10 is an "upright" version in which the display area 16 is oriented vertically relative to the player. Alternatively, the slot machine 10 may be a "slant-top" version in which the display area 16 is slanted at about a thirty degree angle toward the player of the slot machine 10.

Referring to FIGS. 2*a* and 2*b*, the video image 18 in the display area 16 may be either a direct image (FIG. 2*a*) or a graphic image (FIG. 2*b*).

If the video image 18 is a graphic image, as in FIG. 2*b*, the graphic image is preferably generated by a projection arrangement including a video display 14*b* and a partially reflective mirror 20. The video display 14*b* and the partially reflective mirror 20 are relatively positioned to project the graphic image in front of the reels 12*a*, 12*b*, 12*c* between the reels and a player. The video display 14*b* is preferably mounted below the reels 12*a*, 12*b*, 12*c* and is generally perpendicular to the display area 16. The mirror 20 is preferably mounted in front of the reels 12*a*, 12*b*, 12*c* and is oriented at approximately a forty-five degree angle relative to both the video display 14*b* and the display area 16. The graphic image is generally parallel to the display area 16 and may, in fact, occupy the display area 16. Also, the graphic image may be three dimensional. In the embodiment of FIG. 2*b*, the display area 16 includes a glass cover/window. This cover is optionally outfitted with a touch screen that contains soft touch keys denoted by the graphic image and used to operate the slot machine 10.

The video display 14*b* in FIG. 2*b* may be a CRT, LCD, dot matrix, LED, electro-luminescent, or other type of video display known in the art. Also, instead of mounting the video display 14*b* below the reels 12*a*, 12*b*, 12*c*, the display 14*b* may be mounted above the reels with the mirror 20 still oriented at approximately a forty-five degree angle relative to both the video display 14*b* and the display area 16.

Figure 12:
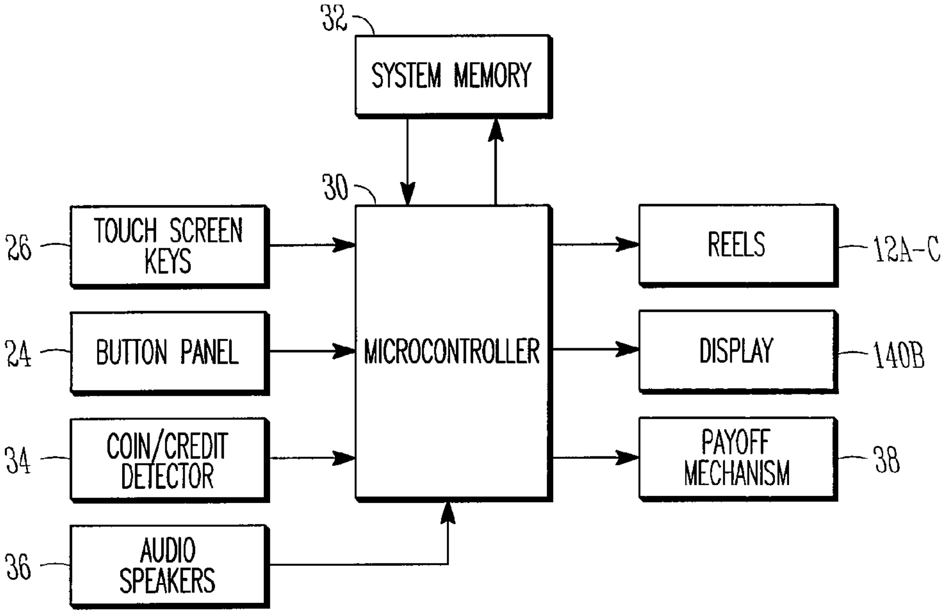
FIG. 12 is a block diagram of a control system suitable for operating the gaming machine.

Referring back to FIG. 1*d*, the slot machine 10 is operable to play a basic slot game with the three mechanical spinning reels 12*a*, 12*b*, 12*c* and a bonus game triggered by a start-bonus outcome in the basic game. The number of mechanical reels may vary, for example, to include one or more additional reels. The mechanical reels may be mounted to a horizontal axis to spin vertically as shown or may, alternatively, be mounted to a vertical axis to spin horizontally. Also, instead of each column of symbols being associated with a single reel, each individual symbol may be associated with a single reel such that a symbol array of nine symbols is associated with nine distinct reels. As shown in FIG. 12, in some embodiments of the invention, superimposed video image 18 may be used to provide one ore more video reels 1102 that may be included in a wagering game along with the physical reels. The rotational motion of a video reel may be synchronized with that of physical reels 12*a-c*. Additionally, in some embodiments, one or more physical reels may be removed from a wagering game by generating a superimposed video image 18 that blocks or obscures the desired reels from the view of the player.

Each of five pay lines 22*a*, 22*b*, 22*c*, 22*d*, 22*e* extends through one symbol on each of the three mechanical reels (and may extend through video reels 1102 in some embodiments). The number of pay lines may be more or less than five and may have various configurations. In some embodiments, one or more pay lines may be displayed on the superimposed video image 18. In addition, pay lines may be modified or skewed by the superimposed video image 18 such that the pay line passes through at least one different symbol that it did prior to the modification or skewing. A pay line may be modified or skewed at random times, predetermined times, or upon selection by a player. For example, a straight pay line may be skewed such that the pay line is no longer a straight line, but passes through symbols not in a straight line. Additional pay lines may be generated at random or at predetermined intervals during game play to provide additional opportunities for winning combinations from those pay lines initially presented to a player.

Figure 3:
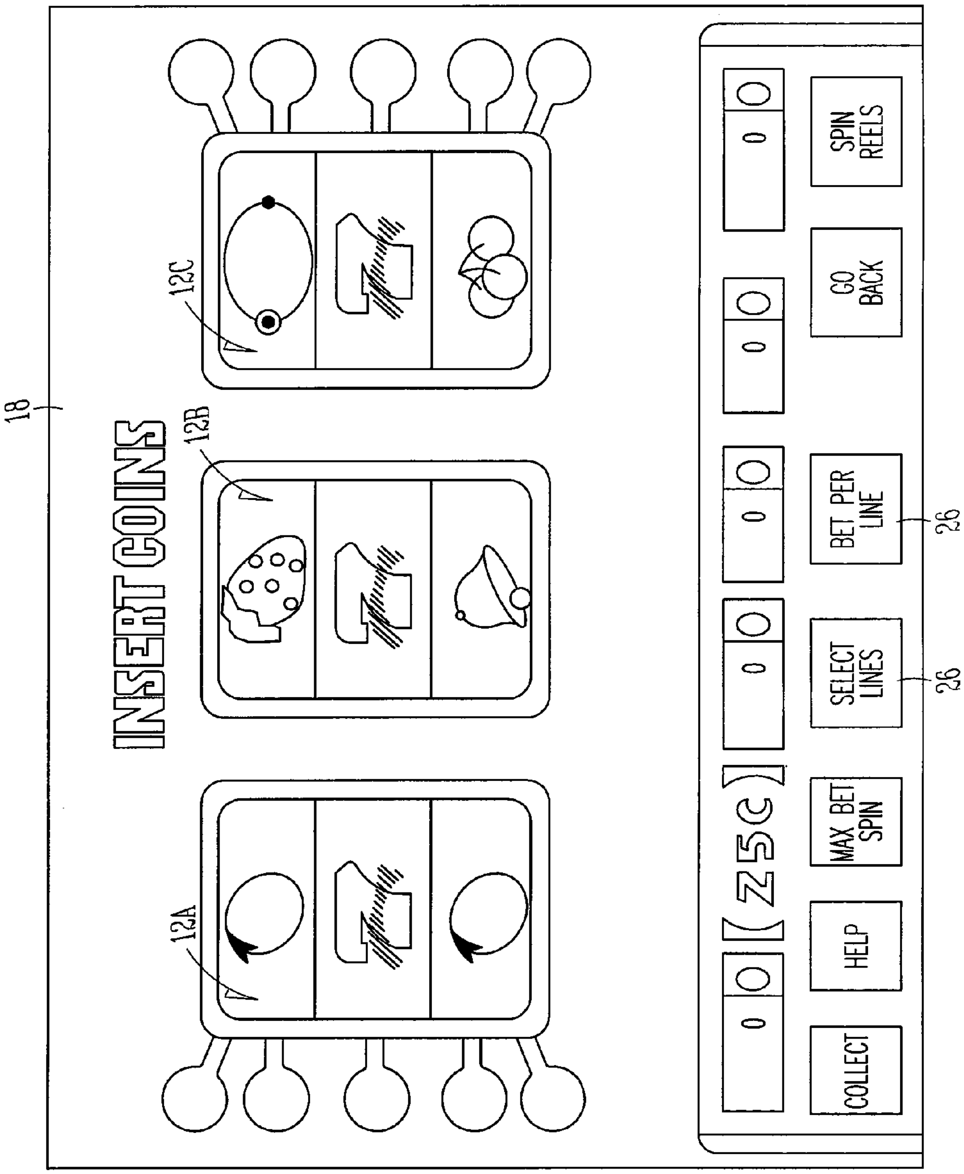
FIGS. 3-11 are front views of a display area of the slot machine with various video images superimposed on the mechanical reels.
Figure 4:
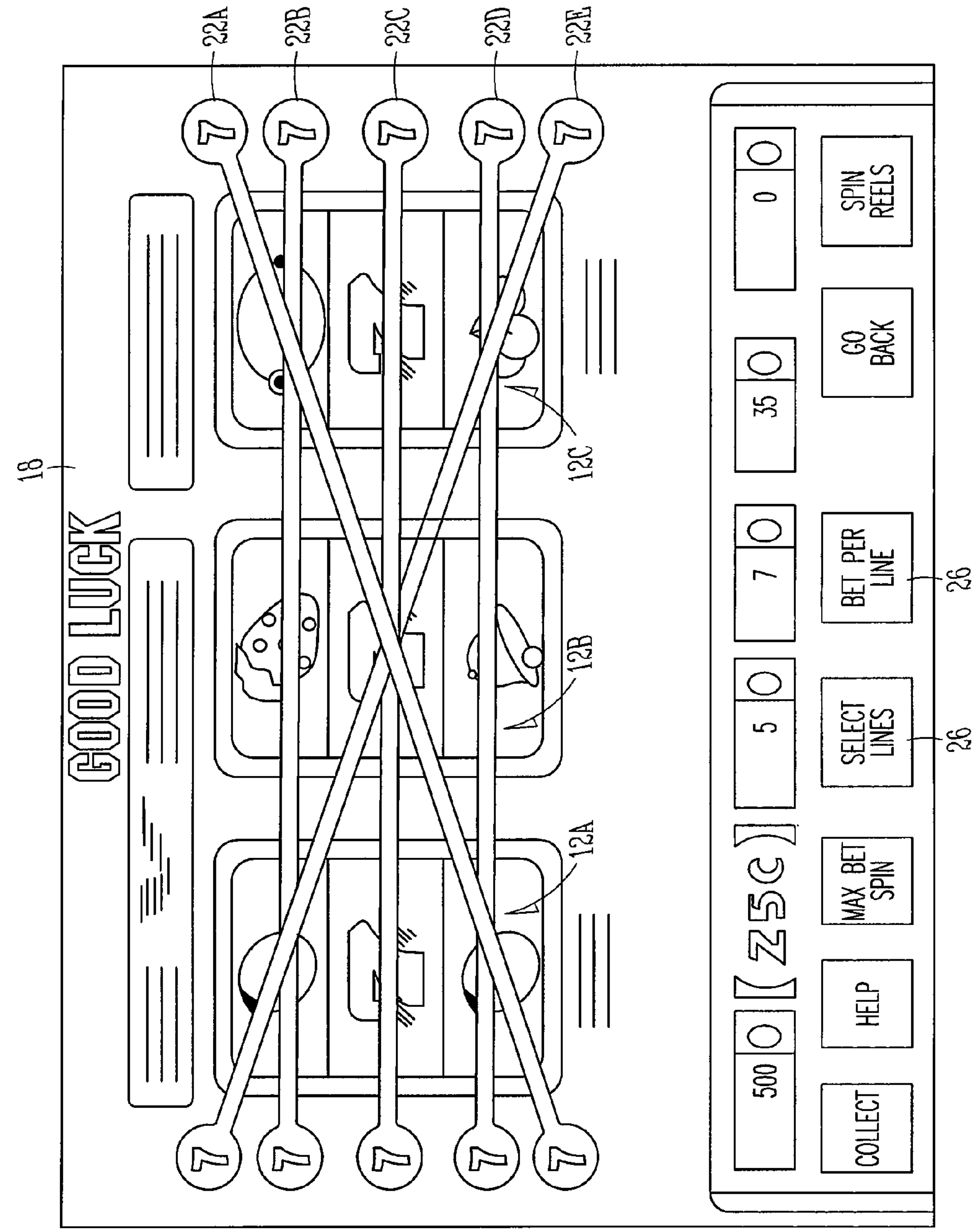

Generally, game play is initiated by inserting a number of coins or playing a number of credits, causing a central processing unit to activate a number of pay lines corresponding to the number of coins or credits played. As shown in FIG. 3, the superimposed video image 18 may depict instructional information prompting the player to insert coins or play credits. The player selects the number of pay lines (between one and five) to play by pressing a "Select Lines" key on a button panel 24. In alternative embodiments, a player may select particular pay lines displayed on the superimposed video image using the touch screen. The player then chooses the number of coins or credits to bet on the selected pay lines by pressing a "Bet Per Line" key on the button panel 24. As shown in FIG. 4, the superimposed video image 18 may depict the activated pay lines and the number of wagered credits per pay line.

After activation of the pay lines, the reels 12*a*, 12*b*, 12*c* may be set in motion by touching a "Spin Reels" key on the button panel 24 or, if the player wishes to bet the maximum amount per line, by using a "Max Bet Spin" key on the button panel 24. Alternatively, other mechanisms such as, for example, a lever may be used to set the reels in motion. The central processing unit uses a random number generator to select a game outcome (e.g., "basic" game outcome) corresponding to a particular set of reel "stop positions." The central processing unit then causes each of the mechanical reels to stop at the appropriate stop position. Symbols are printed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may change over time, for example if play changes from a base wagering game to a bonus game. The superimposed video image 18 may be used to display the changed pay table.

Figure 5:
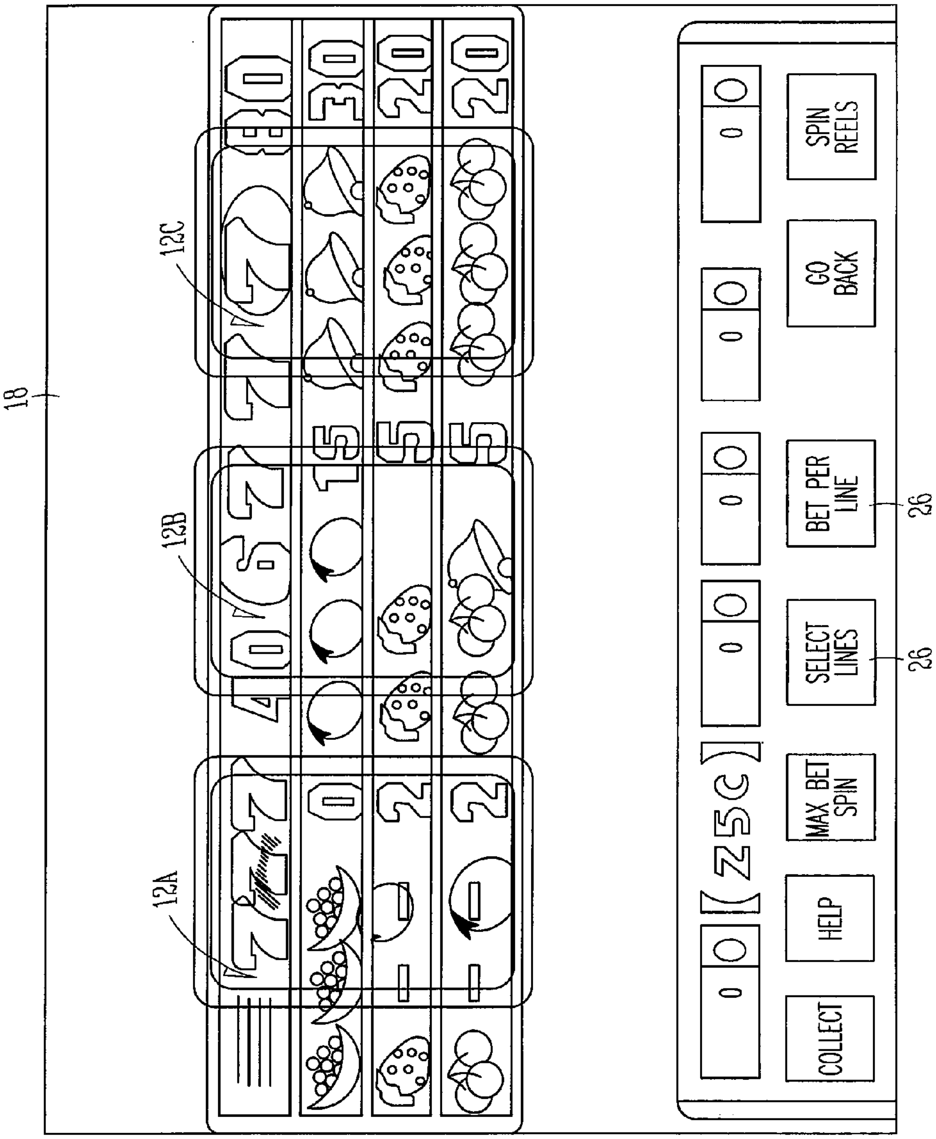

As shown in FIG. 5, the superimposed video image 18 may depict the pay table in response to a command by the player (e.g., by pressing a "Pay Table" key on the button panel 24). A winning basic game outcome occurs when the symbols appearing on the reels 12*a*, 12*b*, 12*c* along an active pay line correspond to one of the winning combinations on the pay table. A winning combination, for example, could be three matching symbols along an active pay line. If the displayed symbols stop in a winning combination, the game credits the player an amount corresponding to the award in the pay table for that combination multiplied by the amount of credits bet on the winning pay line.

Figure 6A:
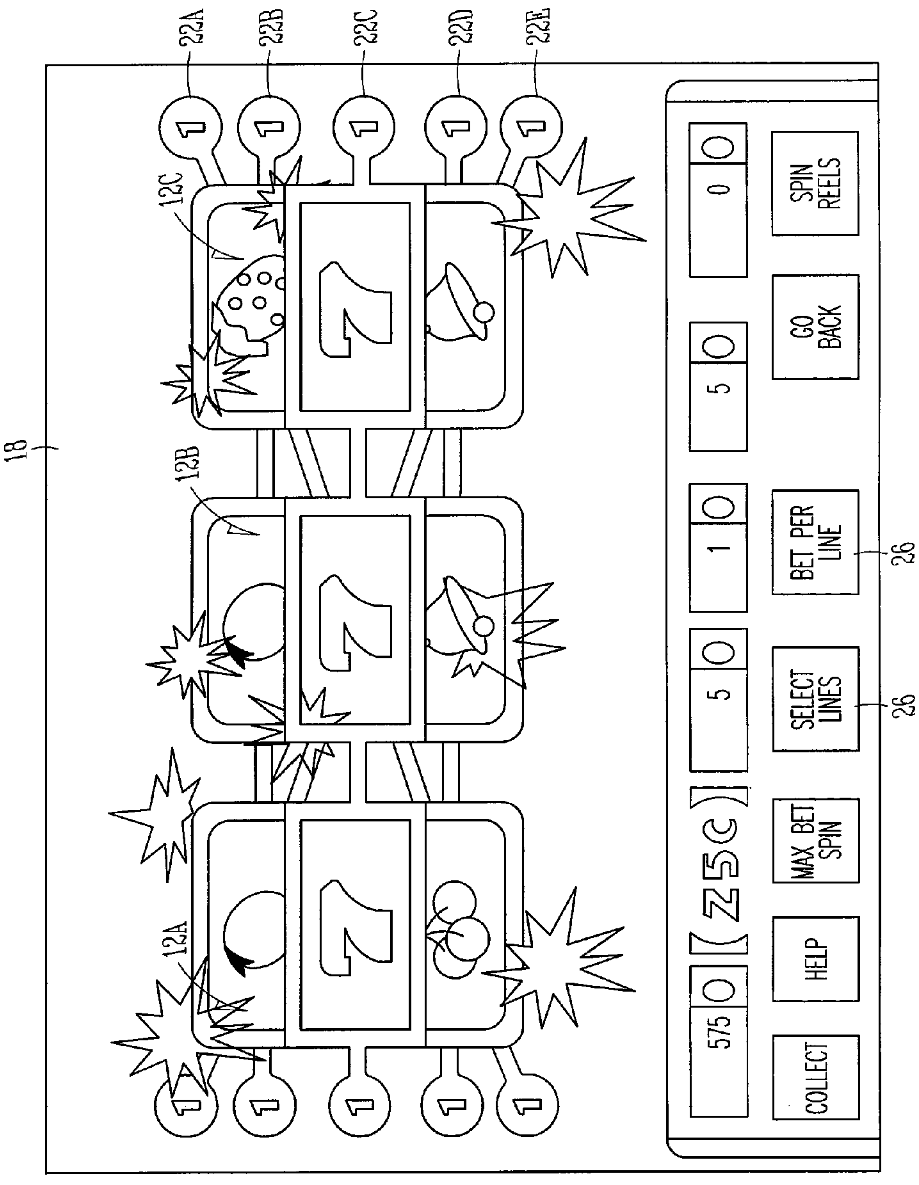
Figure 6B:
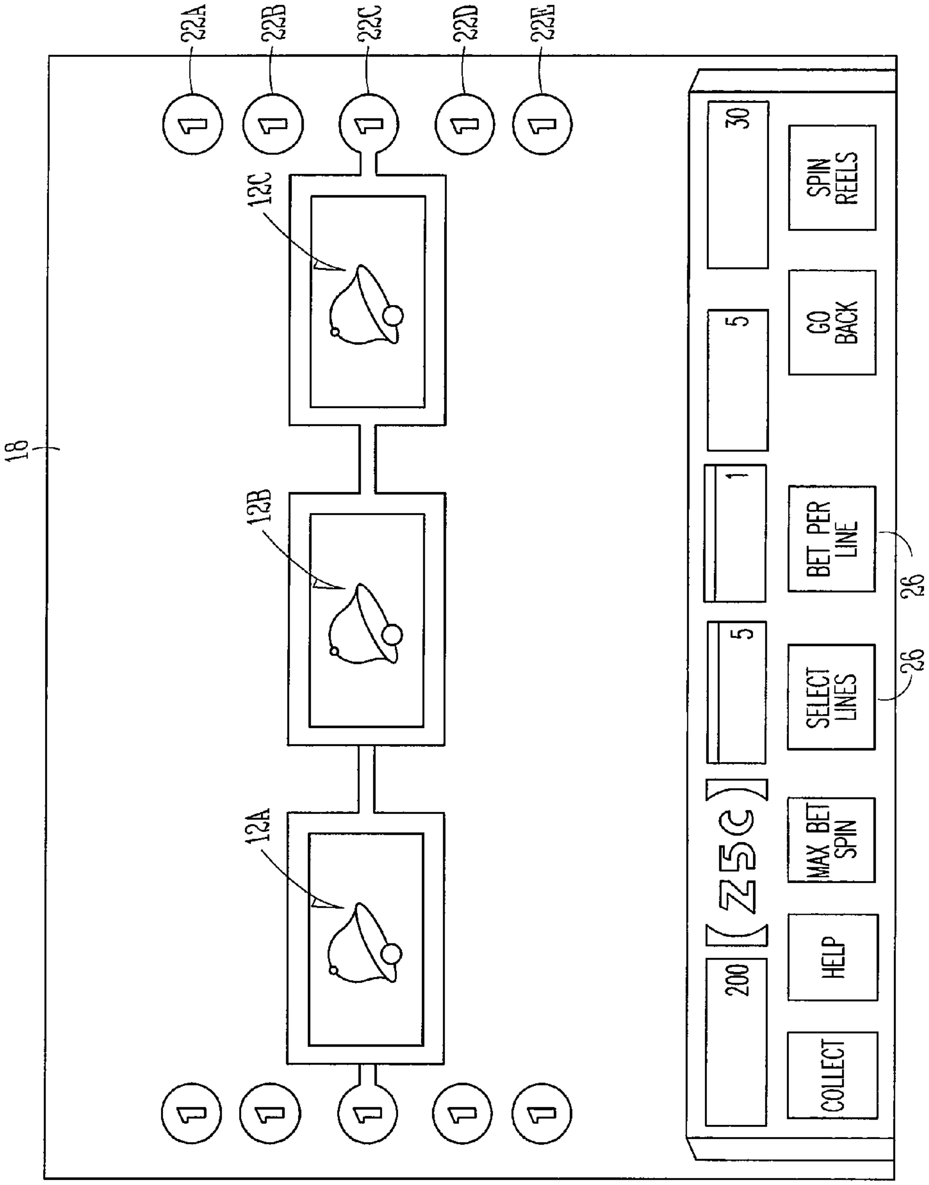

As shown in FIG. 6*a*, the superimposed video image 18 may highlight the winning combination(s) (e.g., "7," "7," "7") and its associated pay line (e.g., pay line 22*c*) and depict the award for that winning combination. Alternatively, as shown in FIG. 6*b*, the video image 18 may obscure all symbols not appearing on an active pay line or not part of a winning outcome. The video image 18 may further include special effects such as flashing the winning pay line(s) and/or the award and providing explosions. The winning pay line(s) may flash, be accompanied by exploding flashes, and display a portion of the pay table. The player may collect the amount of accumulated credits by pressing a "Collect" key on the button panel 24. In one implementation, the winning combinations start from the first reel 12*a* (left to right) and span adjacent reels. In an alternative implementation, the winning combinations start from either the first reel 12*a* (left to right) or the third reel 12*c* (right to left) and span adjacent reels.

In addition, some embodiments of the invention provide supplemental game display on superimposed video image 18. For example, in some implementations, an animated or live character may interact with the game. For example, a character may be used to identify an outcome (e.g. by pointing) or the outcome may be a winning outcome because the character is pointing at it.

In some embodiments, superimposed video image 18, along with a touch screen may be used to implement side betting. For example, a player may select a symbol from the primary game display and make a side bet as to whether or not the symbol will appear during the wagering game. The side bet information may be displayed on superimposed video 18. Such a side bet is independent of the outcome of the wagering game itself. In some embodiments, superimposed video image 18 may display a multiplier at random or predetermined intervals. The multiplier may then cause any winning outcome to be multiplied by the indicated multiplier.

In addition, in some embodiments, superimposed video image 18 may provide a foreground image that interacts with a background image on the primary display. For example, in some implementations, the background is a pachinko game comprising a plurality of pins and one or more lanes representing winning outcomes. The foreground image on superimposed video image 18 may comprise a simulated pachinko ball where the path through the pins is randomly generated to simulate an actual pachinko game. Similarly, the background image may comprise a roulette wheel and the foreground image on superimposed video image may be a roulette ball that "moves" around the roulette wheel and stops over a randomly selected position of the wheel. Additionally, the background may comprise a backlit board, and the foreground image may provide one or more tokens or markers that are moved to positions on the game board. In some implementations, the backlit board may comprise a ladder (i.e. a vertical strip) divided into positions having values. The foreground image may display an indicator or character (possibly animated) that points to a winning position on the ladder. Further, the background may comprise a diorama, and the foreground image may comprise one or more tokens or markers that are moved over positions in the diorama.

In some embodiments of the invention, superimposed video image 18 may be used to provide additional games instead of or in addition to interacting with a wagering game display on a primary game display 120. In one embodiment of the invention, an additional game played using superimposed video image 18 is a bank symbols game. In general, a bank symbols game operates by identifying certain symbols as "bankable" symbols. When these symbols appear on a reel or other game display, the symbol is collected in a bank symbolically displayed on superimposed video image 18. At some point during game play, if a predetermined symbol (sometimes referred to as a "break the bank" symbol) appears, the banked symbols may be redeemed for credit. In an alternative implementation, the banked symbols may be used to play a second game, for example tic-tac-toe.

Other additional games that may be implemented include but are not limited to horse racing and other animated games, and video bingo, keno, slots etc. that may be displayed on superimposed video image 18.

If the display area 16 includes a touch screen mounted to either the display 14*a* in the direct image embodiment of FIG. 2*a* or the glass cover in the graphic image embodiment of FIG. 2*b*, the video image 18 may duplicate some or all of the aforementioned keys on the button panel 24 as touch keys 26 as shown in various Figures. A player can then enable a desired function either by touching the touch screen at an appropriate touch key 26 denoted by the video image 18 or by pressing an appropriate key on the button panel 24. Touch keys 26 may also be used to implement buttons in addition to those appearing on button panel 24. For example, one or more touch keys 26 may be used to select a denomination for the wagering game, call an attendant, solicit help in playing the game, request food or drink, or request "comps."

In reel based implementations, one or more touch keys 26 may be used to implement a "skill stop" function. In these implementations, upon pressing a "skill stop" touch key, the reel or reels associated with the skill stop touch key stop rotating.

Additionally, in implementations having a diorama as a primary game display, the touch screen may be used to indicate one or more elements of the diorama that a player desires to select. The superimposed video image may be used to highlight selected elements, for example by displaying a highlighted box around the selected element.

In some embodiments, the gaming machine may be capable of providing a number of different wagering games or variations on a wagering game. In such embodiments, the superimposed video 18 may be used to provide a menu of available games and/or game variations, and a user may use the touch screen to select a desired game or game variation.

Included among the plurality of basic game outcomes is a start-bonus outcome for triggering play of a bonus game. A start-bonus outcome may be defined in a number of ways. For example, a start-bonus outcome may occur when a special start-bonus symbol or a special combination of symbols appears on one or more of the reels 12*a*, 12*b*, 12*c*. The start-bonus outcome may require the combination of symbols to appear along an active pay line or may, alternatively, require that the combination of symbols appear anywhere on the display, regardless of whether the symbols are along an active pay line. The appearance of a start-bonus outcome causes the central processing unit to shift operation from the basic slot game to the bonus game.

Figure 7:
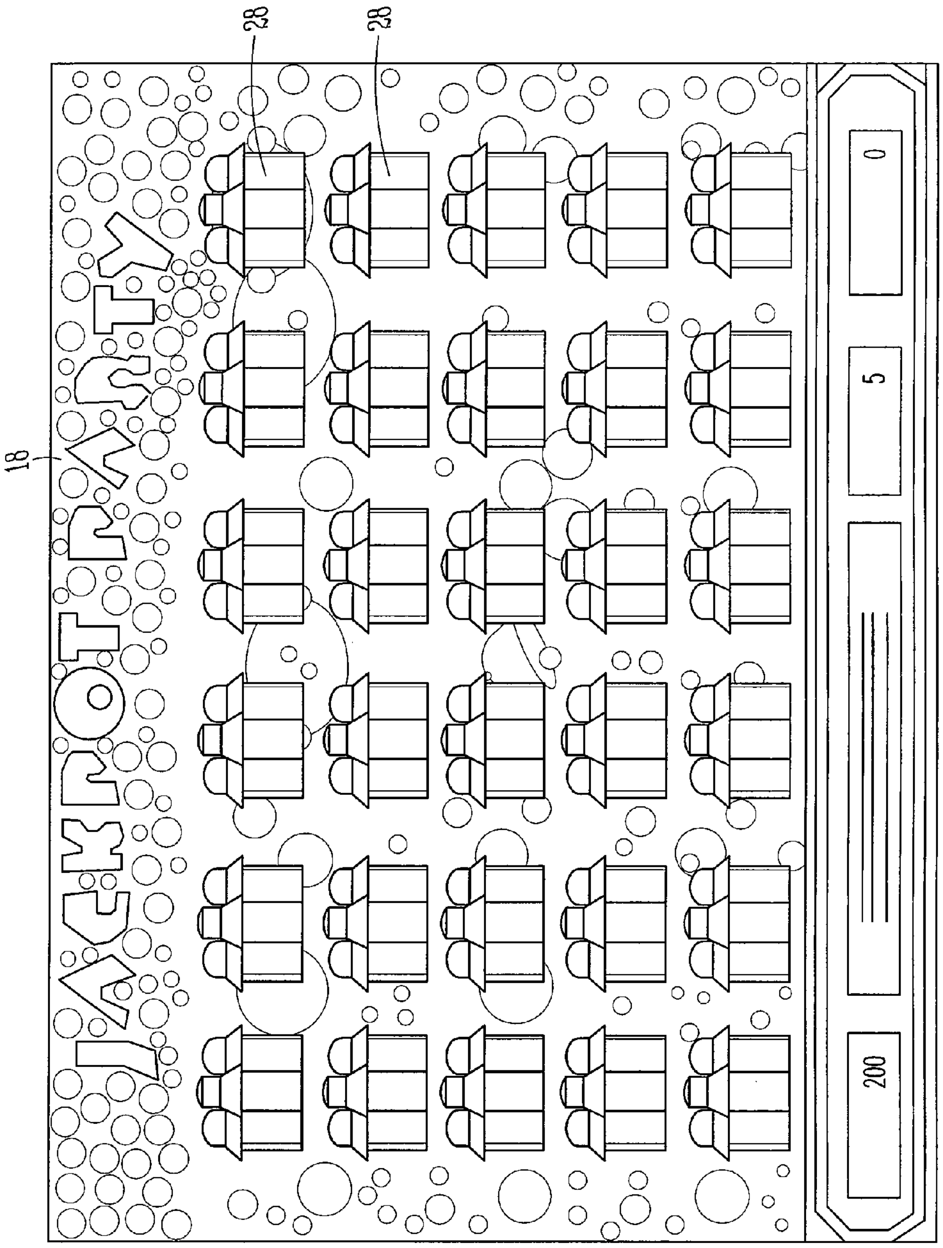

As shown in FIG. 7, the video image 18 may depict the bonus game and any bonuses resulting therefrom. The bonus game may, for example, include free spins of a new set of video reels included in the video image 18. Winning combinations on the video reels may be defined by the same pay table as used for the mechanical reels or a different pay table altogether. The bonus game may be interactive and require a player to select one or more selectable elements 28 to earn bonuses. Also, the bonus game may depict one or more animated events and award bonuses based on an outcome of the animated events. Furthermore, the bonus game may be depicted by the video image 18 alone or in conjunction with a video image depicted on an optional top box video display 40 (see FIG. 1*d*). The two video images may be linked to appear like one unified image. Upon completion of the bonus game, the central processing unit shifts operation back to the basic slot game.

In some embodiments, a bonus game may implement a shuffle feature. In these implementations, symbols on a reel may be converted to a number. The numbers are then displayed on superimposed video 18, and during the bonus game the numbers are shuffled. The resulting shuffled number represents the outcome of the bonus game.

In alternative embodiments, a bonus game may be played on the primary game display, and the superimposed video image 18 may be used to highlight symbols on the primary game display to indicate that a bonus game (and not a wagering game) is being played. For instance, in a reel based wagering game, the appearance of the reels or the symbols on the reels may be changed during bonus games. Examples of such appearance changes include changing the color, border highlighting, or shape of the reel or symbol using superimposed video 18 to indicate a bonus game is being played.

Figure 8A:
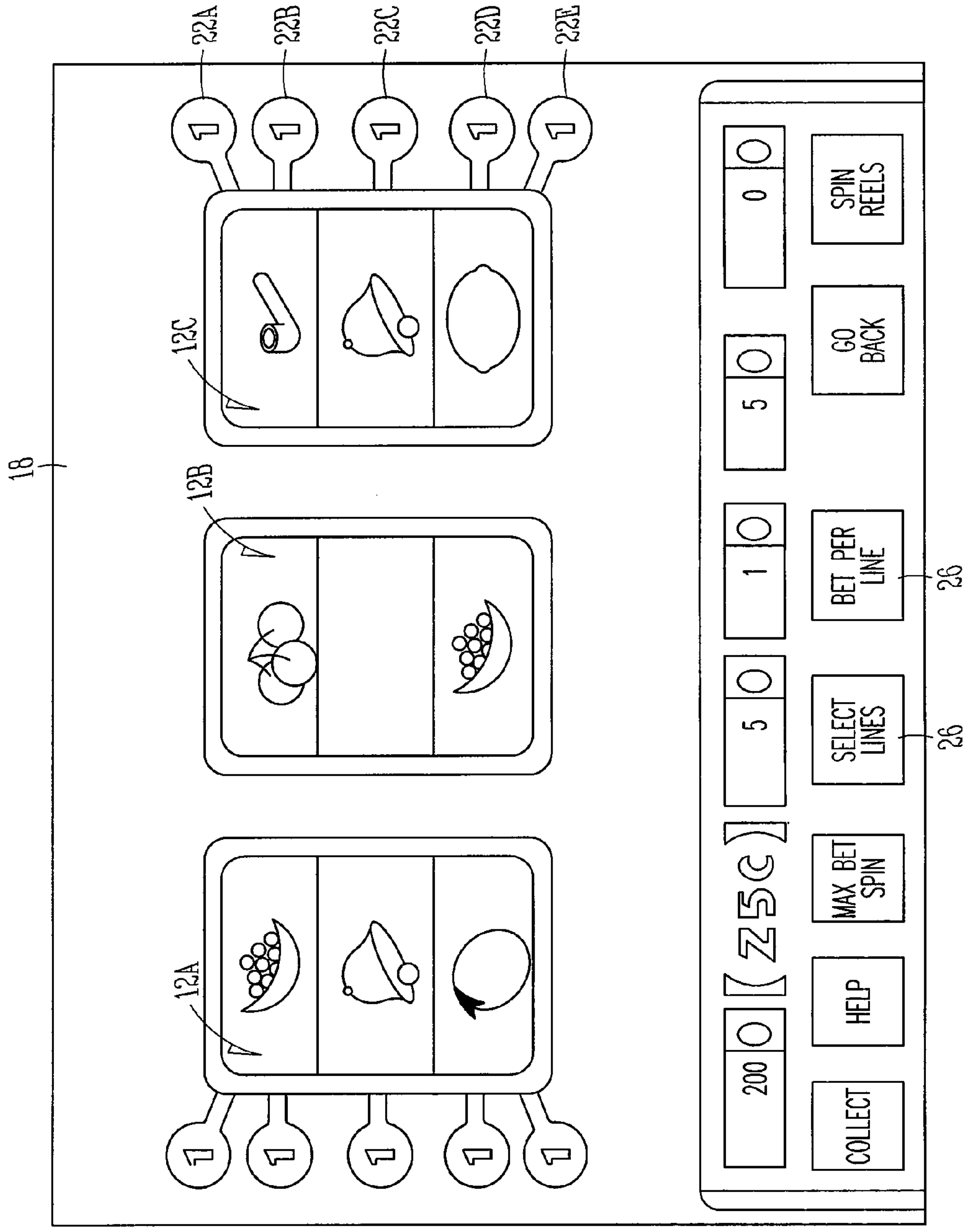
Figure 8B:
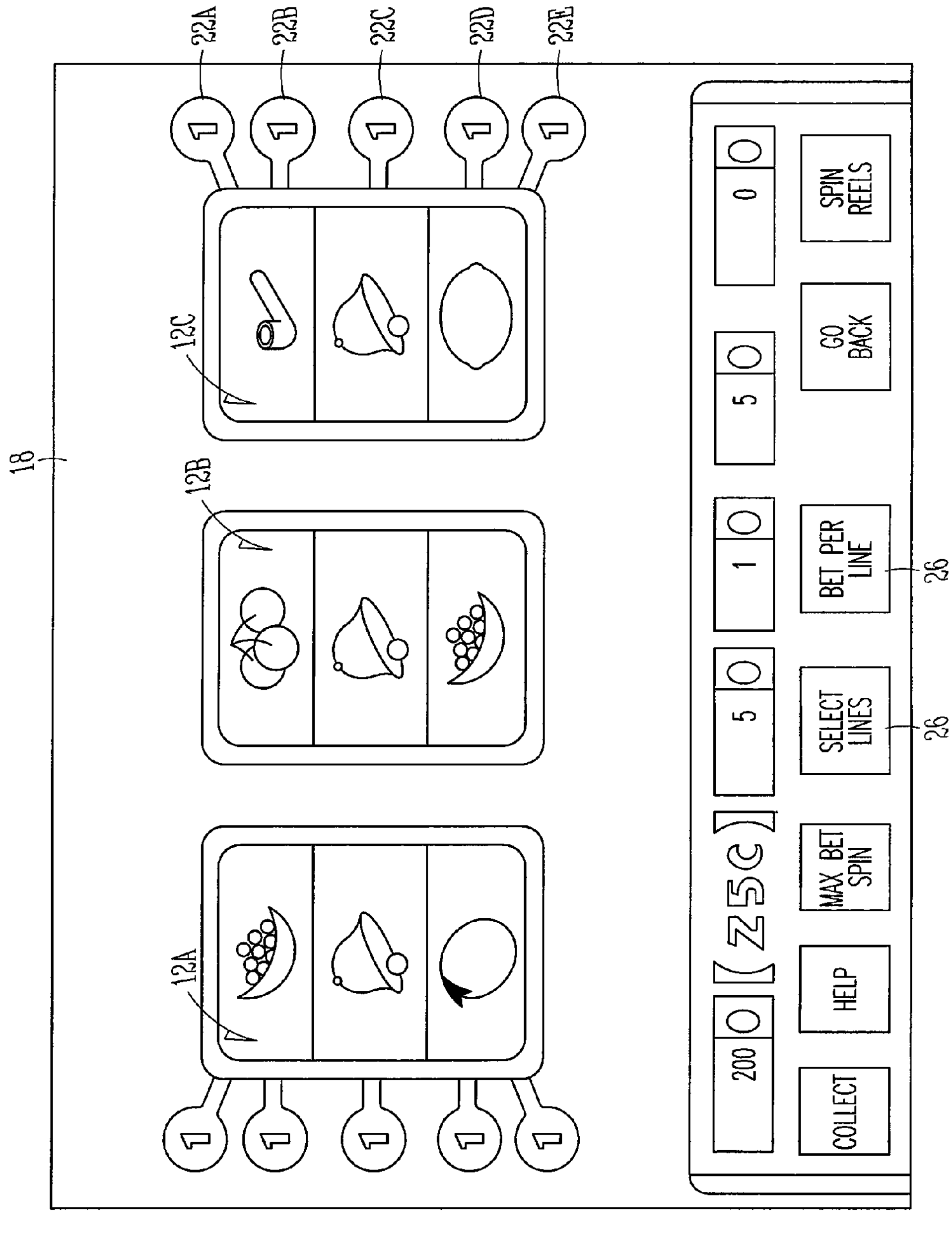
Figure 8C:
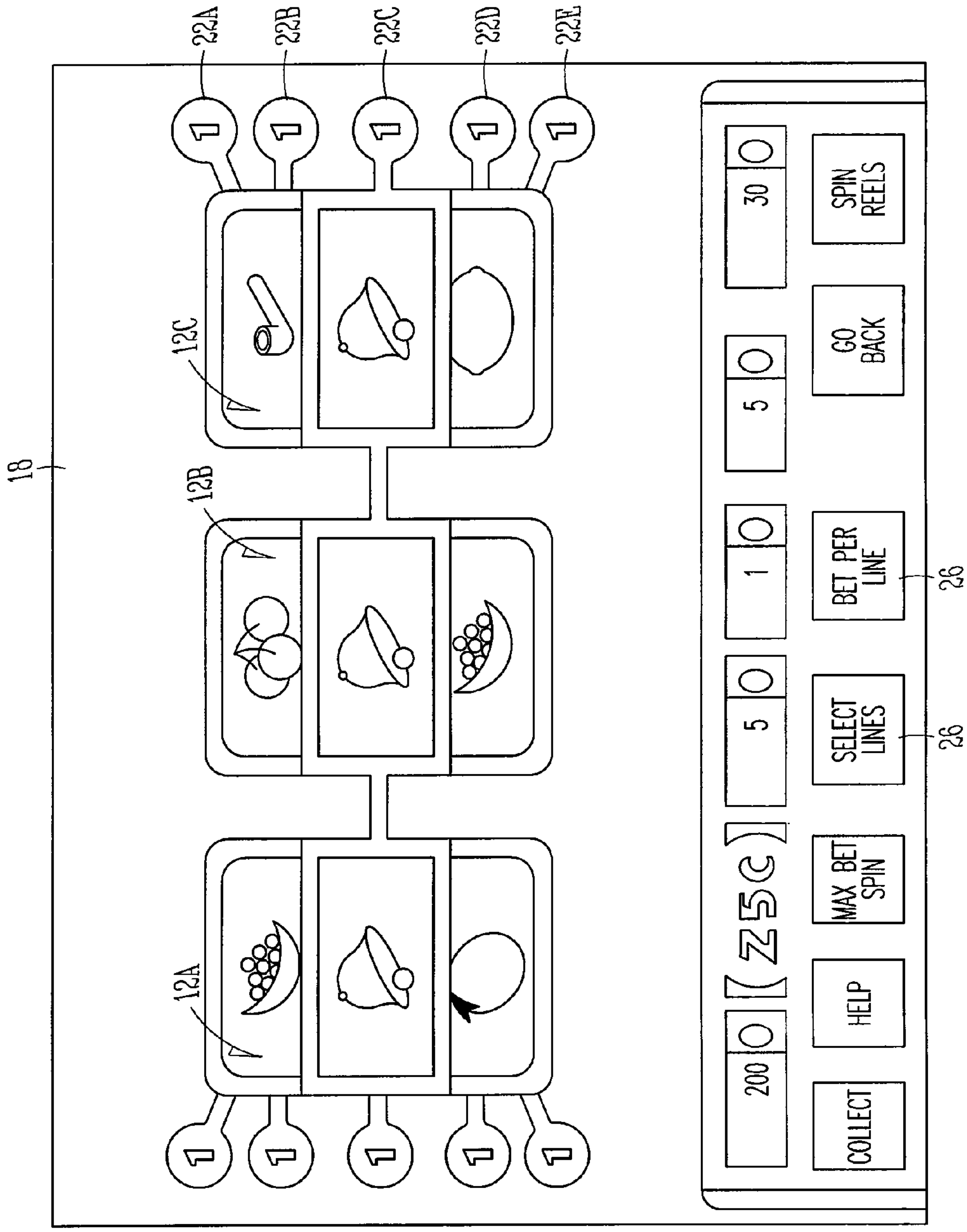

As shown in FIGS. 8*a-c*, 9*a-c*, and 10*a-c*, the video image 18 may be used to modify one or more symbols printed on one or more of the stopped mechanical reels 12*a*, 12*b*, 12*c*. For example, in response to a predetermined random or non-random event, the video image 18 may transform a reel symbol into a different symbol, such as a symbol needed to complete a winning combination. The different symbol is generated by the video image 18. In FIGS. 8*a-c*, the video image 18 depicts an animation transforming (e.g., "morphing") a blank symbol on mechanical reel 12*b* into a BELL symbol to form a winning combination of three BELL symbols along pay line 22*c*.

Figure 9A:
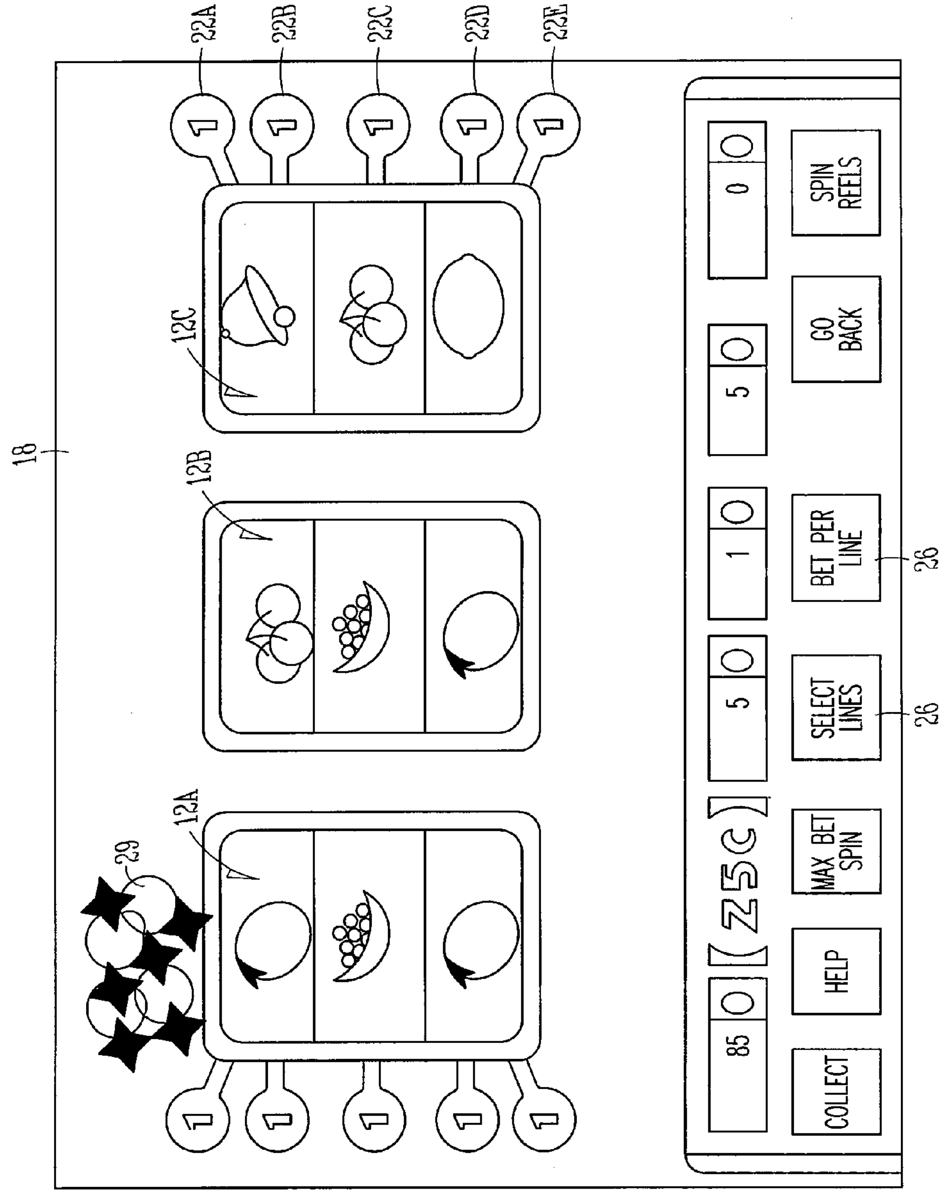
Figure 9B:
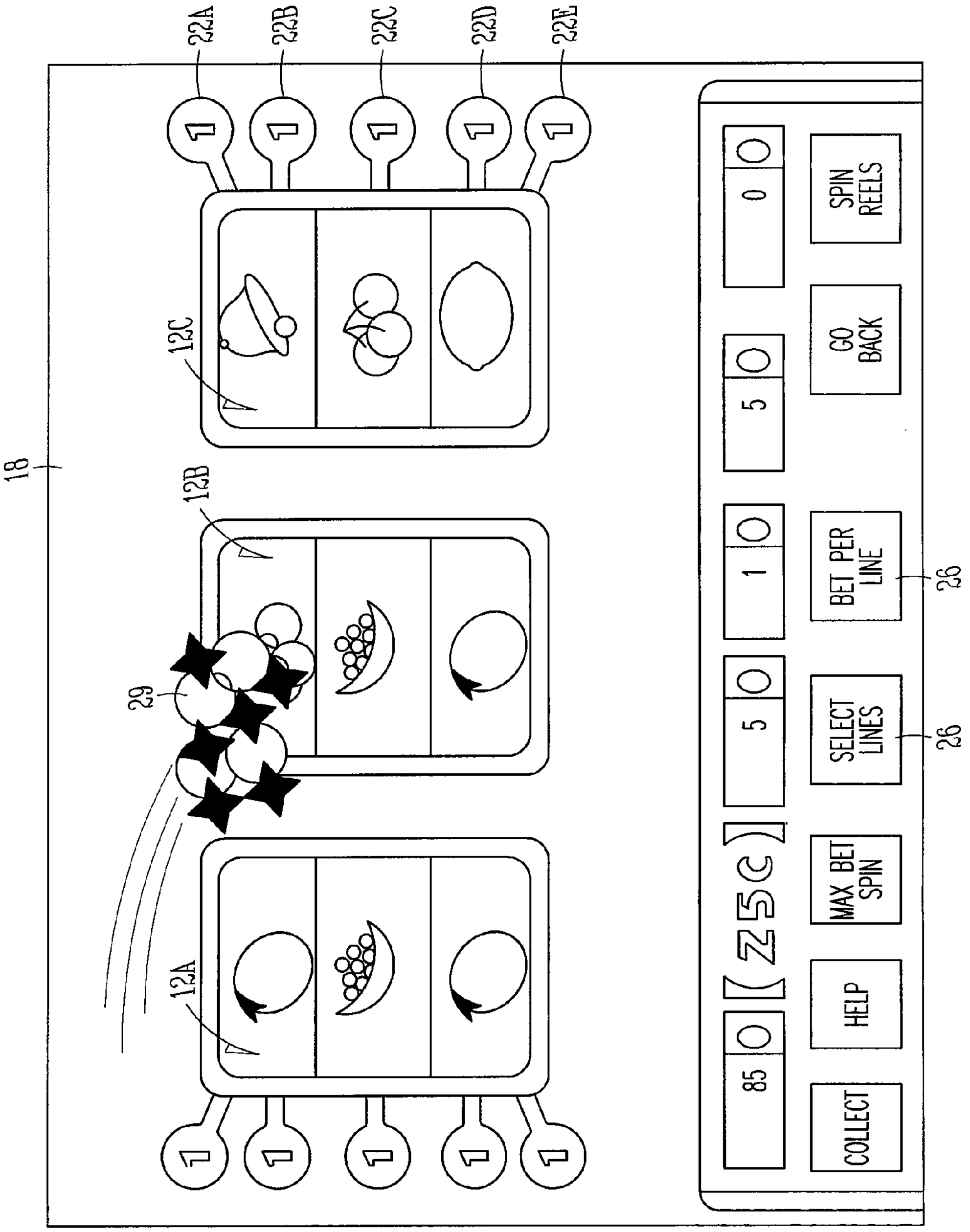
Figure 9C:
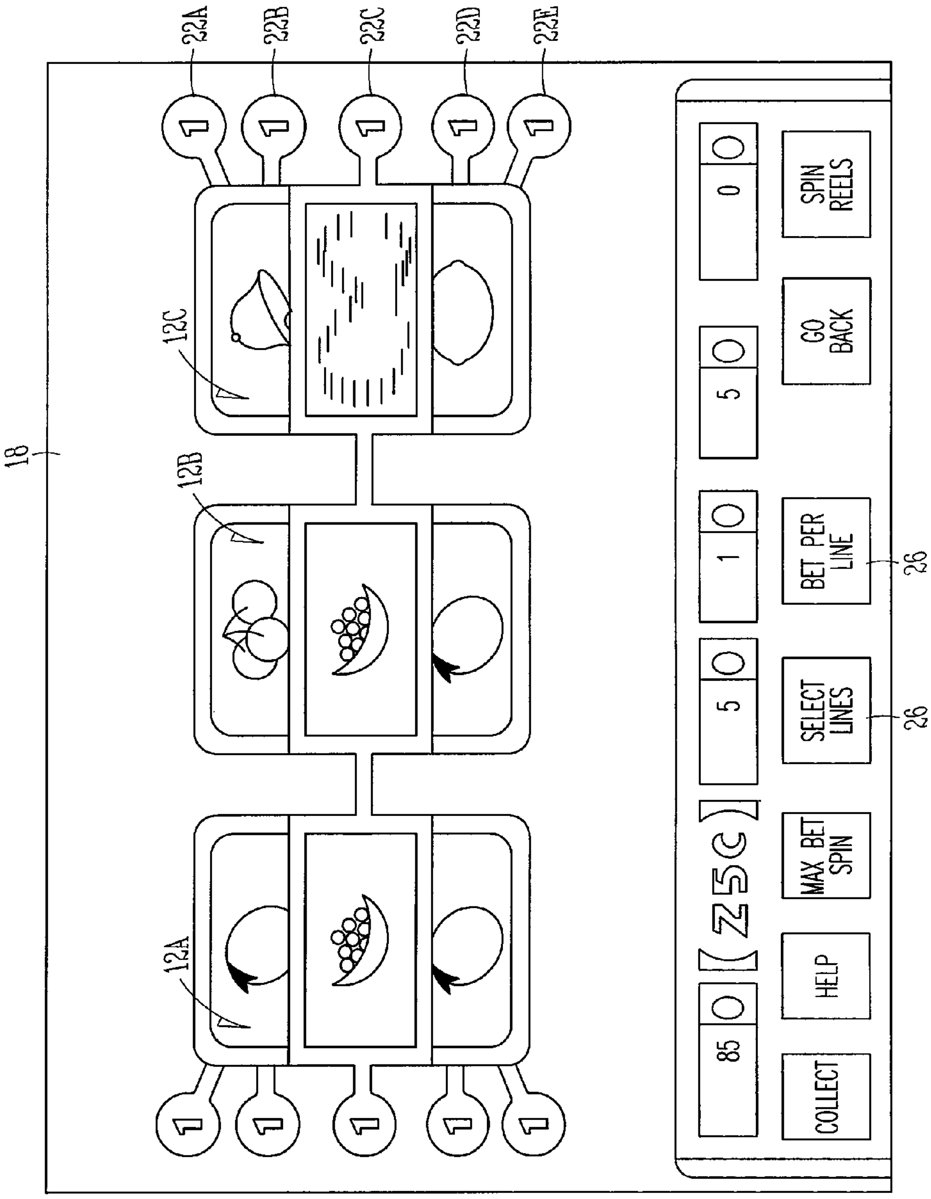

In addition, referring to FIGS. 9*a-c*, in response to a predetermined random or non-random event, the video image 18 may depict an animation in which a video indicator 29 is moved from a periphery of the display area (e.g., a corner of the display area away from the mechanical reels) to one or more of the symbols on the reels. The moving indicator 29 may identify the reel symbols to which it moves as a special symbol to be evaluated as, for example, a wild symbol or a scatter pay symbol. In further implementations, the moving indicator may comprise a window that moves over symbols.

Figure 10A:
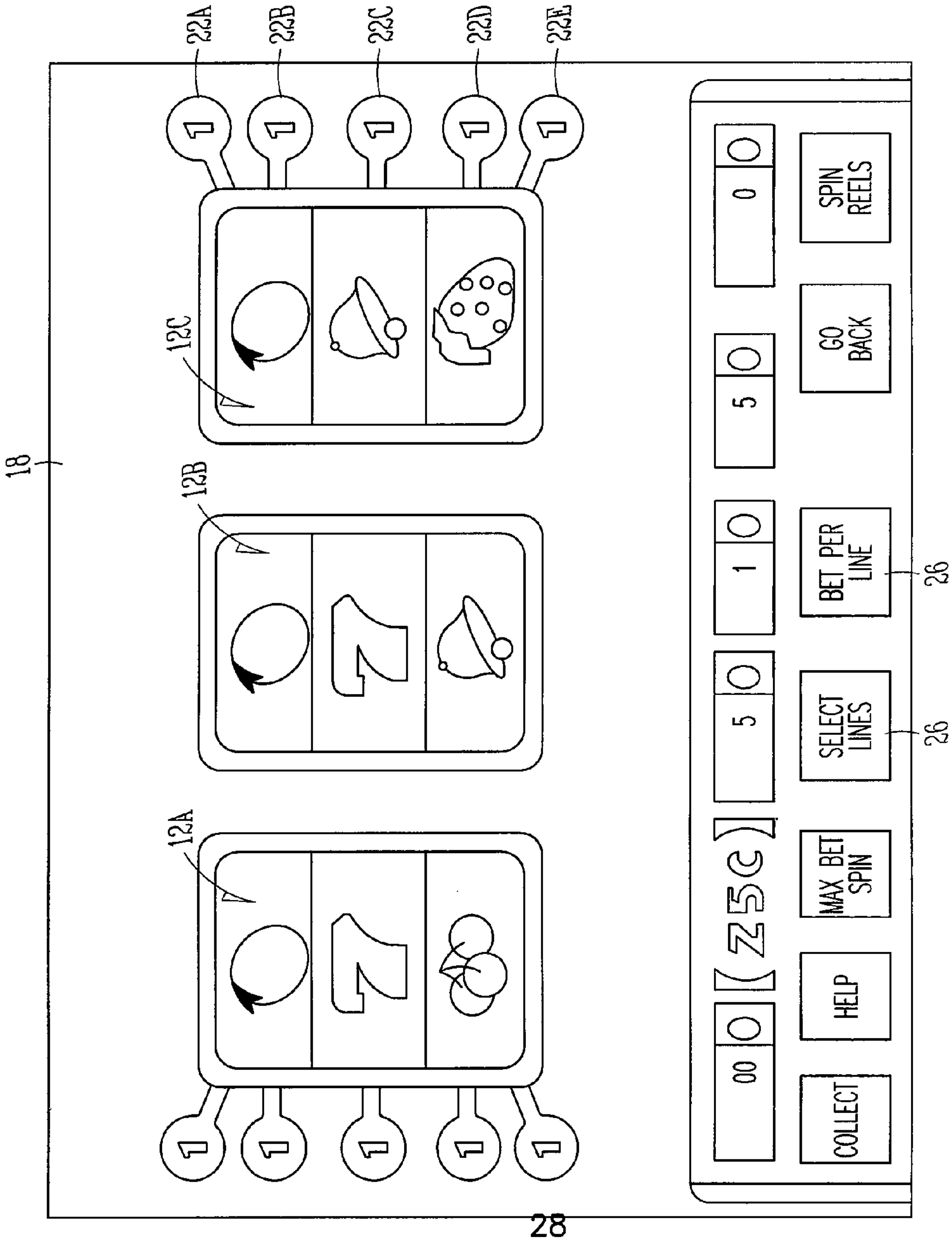
Figure 10B:
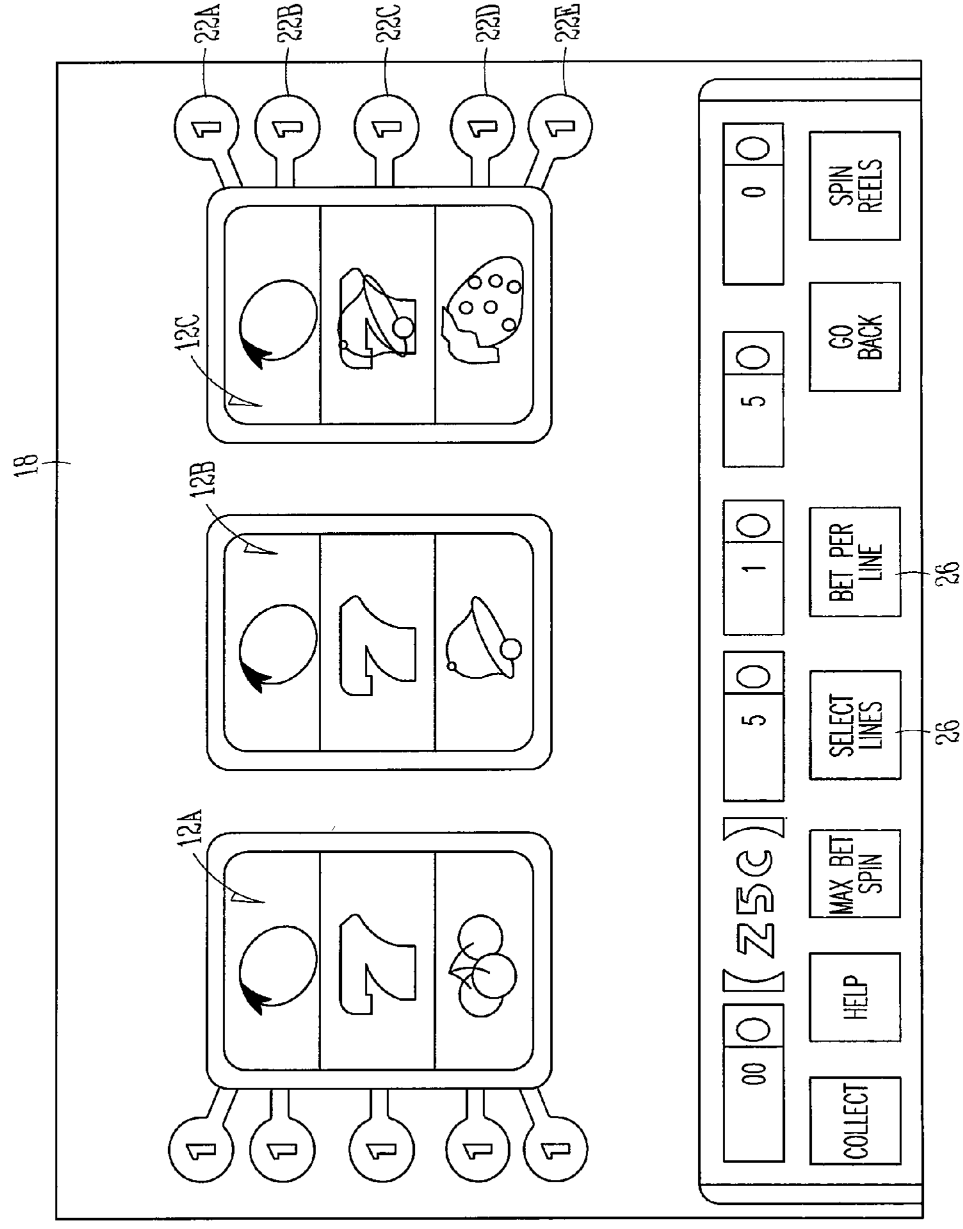
Figure 10C:
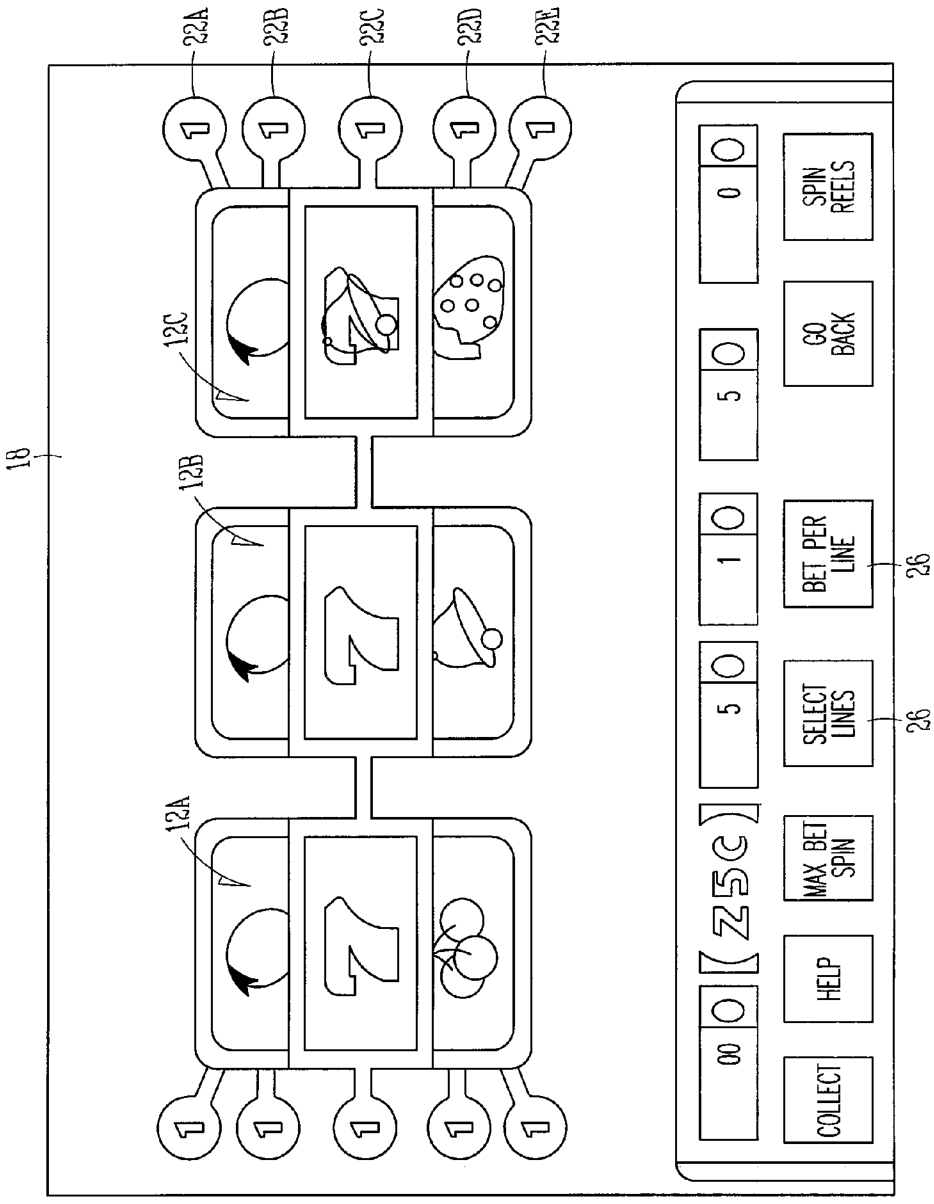
Figure 11:
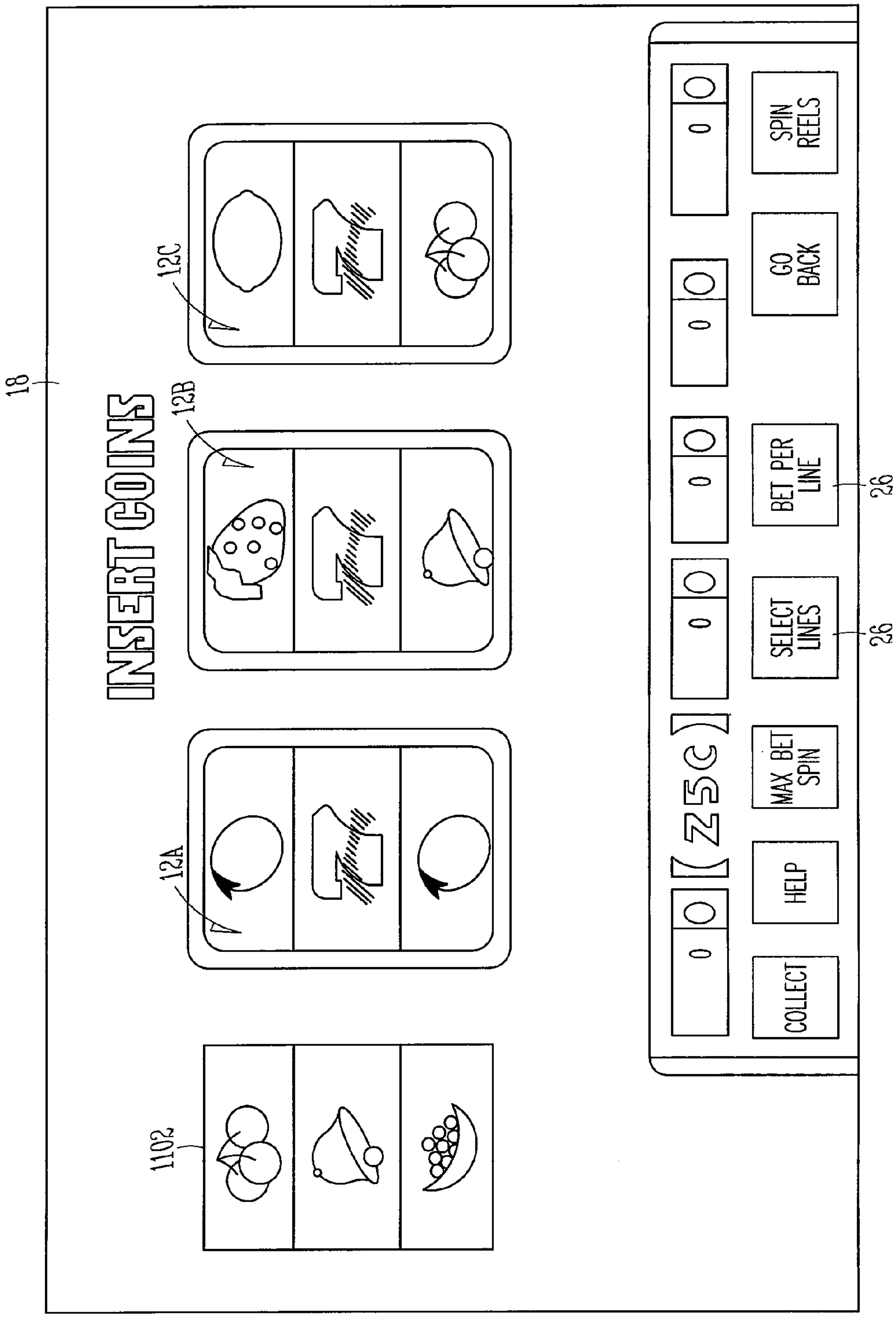

In FIGS. 10*a-c*, a video indicator 29 has moved to a CHERRY symbol on mechanical reel 12*c*. If the CHERRY symbol is thereby designated a wild symbol, the displayed symbol array includes a winning combination of three MELON symbols along pay line 22*c* where one of the three MELON symbols is formed by the wild symbol. Further, in FIGS. 10*a-c*, the video image 18 depicts an animation transforming a BELL symbol on reel 12*c* into a SEVEN symbol to form a winning combination of three SEVEN symbols along pay line 22*c*. The replacement SEVEN symbol generated by the video image 18 is sufficiently opaque or translucent to substantially cover the BELL symbol printed on mechanical reel 12*c*.

In some embodiments, the symbols display on a primary game display may be either blank or generic, and the superimposed video image 18 may be used to differentiate the symbols by adding supplemental indicia. For example, a generic reel based gaming machine may comprise reels having blank or generic symbols, and the superimposed video image may be used to provide a theme for the wagering game. Further, the symbols may be blank and the supplemental indicia may add a value to the symbol. In some embodiments, the supplemental indicia may add a rank and/or suit to symbols representing playing cards. In some embodiments, the video image 18 may be synchronized with the movement of the reels. In further implementations, a live video or generated animation may be displayed over one or more symbols on a mechanical reel.

While symbols on reels have been described above, it should be noted that any type of symbol display mechanism may be used. For example, the symbols may appear on a "flipper" comprising a series of tabs arranged on a hub. Two of the tabs, a top and bottom tab are exposed to the player and present a symbol. As the hub rotates, the next tab "flips" over, thereby exposing a new top and bottom tab. A video image may be superimposed over such a top and bottom tab in the same manner as discussed above with respect to symbols on reels. The invention is not limited to any particular mechanism for displaying a symbol or symbol space.

The slot machine is preferably designed to adjust the appearance of the video image 18 in terms of transparency, translucency, or opacity depending on the purpose of the video image 18. On the one hand, to permit clear viewing of the mechanical reels 12*a*, 12*b*, 12*c* underlying the video image 18, the portion of the video image 18 directly overlying the reels has a window or cutout.

FIG. 12 is a block diagram of a control system suitable for operating the gaming machine. The control system includes a central processing unit with a microcontroller 30 and system memory 32. The memory 32 preferably comprises a separate read-only memory (ROM) and battery-backed random-access memory (RAM). It will be appreciated, however, that the system memory 32 may be implemented on any of several alternative types of memory structures or may be implemented on a single memory structure. For example, the read-only memory may be replaced or supplemented with a mass storage unit such as a removable flash memory or a hard drive. The system memory may be used to store game-related data associated with the chance games played on the gaming machine. The game-related data may, for example, include game code, math tables, a random number generator, audio resources, and video resources. The player may select an amount to wager and other game play functions via the touch screen keys 26 (if provided) or button panel 24. The wager amount is signaled to the microcontroller 30 by a coin/credit detector 34. In response to the wager, the microcontroller 30 executes the game code which generates a randomly based outcome. In the case of slots, the microcontroller 30, based on the randomly generated outcome, rotates and stops the mechanical reels 12*a*, 12*b*, 12*c* at the selected outcome. Also, the microcontroller 30 selectively accesses the video resources to be included in the video image 18 provided by the video display 14*a* (FIG. 2*a*) or 14*b* (FIG. 2*b*) and the audio resources to be played through one or more audio speakers 36 mounted to a housing of the slot machine. If the outcome corresponds to a winning outcome identified on the pay table, the microcontroller 30 instructs a payoff mechanism 38 to award a payoff for that winning outcome to the player in the form of coins or credits.

LED (light emitting diode) displays may be used to add new and exciting aspects to gaming machines as described in more detail below and according to the embodiments of the present system. Typically, the display area of a programmable display is composed of rows and columns of "pixels". The term pixel is short for "Picture Element". The characters and graphics of a message are formed by turning on or activating specific patterns of pixels within the display array.

An LED is a tiny chip of silicon made to produce light in a variety of colors including red, green, yellow, and blue. Bi-color LED's are made using red and green LED's in the same package. It is possible to create 256 or more shades of color from red to green using only red and green bi-color LED's. Adding blue LED's to the red and green will give over 2 million shades of color.

LED (light emitting diodes) displays are described by the number of rows by the number of columns. For example, a 7×40 display has 280 pixels. Individual LED's may be inserted one at a time into a circuit board. The anode and cathode lead wires are then individually soldered to the circuit board. A pixel may be composed of either one LED or several LED's installed close together. LED's grouped together appear as a single pixel when all LED's in the group are lighted at the same time. A group of LED's in a single pixel may contain more than one color LED. The various colors are produced by turning on the appropriate combination of LED's in the pixel. Data block modules are LED's mounted on rectangular circuit boards and epoxied into block modules that contain a specific number of rows and columns of pixels.

Pixel diameter and center to center spacing define the resolution or density of the character being displayed. The closer the pixels are to each other, the higher the resolution or density of the character. Programming sets the characteristics of the characters used in the message: font, size, color, and position; as well as any special effects.

In general terms an embodiment of the present system is a gaming machine having at least two gaming states; and an LED (light emitting diode) display having at least one of two colors and at least one graphic symbol respectively associated with the at least two gaming states.

The at least two colors may be mood producing colors that increase game play. The LED display may emit a color of the at least two colors that is associated with a current gaming state of the at least two gaming states.

More specifically, an embodiment of the present system may have: at least two gaming states; a primary game display operable to display the outcome of a wagering game in response to a wager; and an LED (light emitting diode) display overlaying the primary game display, the LED display having at least two colors respectively associated with the at least two gaming states, and the LED display having at least one window oriented with at least a portion of the primary game display. The window may be one of a cutout in the LED display and a clear area in the LED display.

In another embodiment of the present system the gaming machine may have: a primary game display operable to display the outcome of a wagering game in response to a wager, the primary game display operable to display a sequence of symbols in a symbol array having at least one column and a plurality of rows, the sequence defining a first award; and an LED (light emitting diode) display overlaying the primary game display, the LED display having at least one window oriented with at least a portion of the primary game display, and the LED display operable to produce at least one color that highlights the appearance in the window of at least one symbol in the primary game display.

Yet another embodiment of the present system may have a gaming machine having: a primary game display operable to display the outcome of a wagering game in response to a wager, the primary game display operable to display a sequence of symbols in a symbol array having at least one column and a plurality of rows, the sequence defining a first award; and an LED (light emitting diode) display overlaying the primary game display, the LED display having at least one window oriented with at least a portion of the primary game display, and the LED display operable to produce at least one graphic symbol in response to an appearance in the window of at least one symbol in the primary game display.

The primary game display may be operable to display a sequence of symbols in a symbol array having at least one column and a plurality of rows, the sequence defining a first award. The gaming machine may further have a bonus game having a reordering of the sequence of symbols in the symbol array, the reordered sequence defining a second award as a function of the graphic symbol in combination with the reordered sequence.

Figure 13:
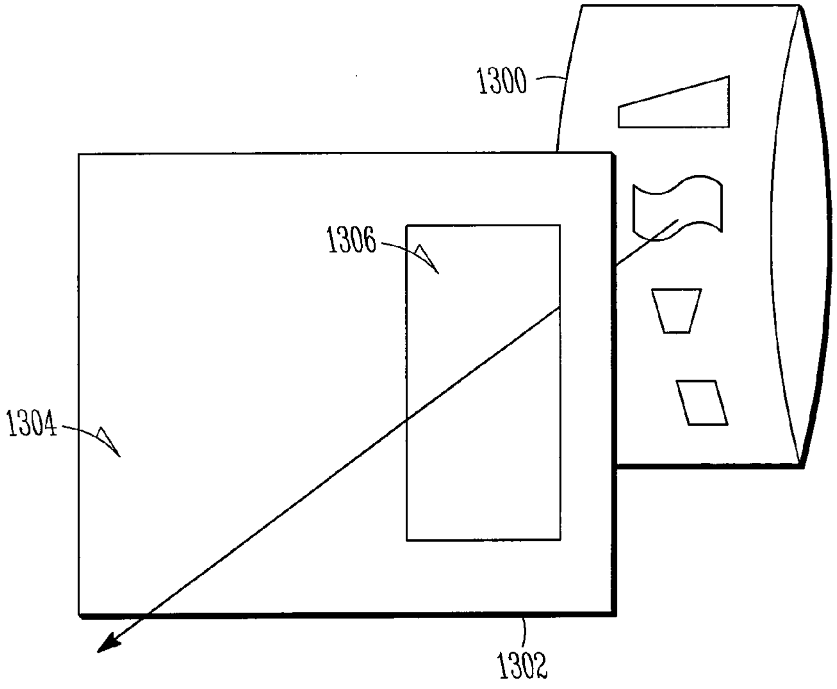
FIG. 13 depicts an embodiment of a gaming machine that has a primary game display, which is a reel, operable to display the outcome of a game.

FIG. 13 depicts an embodiment of a gaming machine that has a primary game display 1300, which is a reel, operable to display the outcome of a game. An LED display 1302 overlays the primary game display 1300. In an embodiment the LED display 1302 may have at least one non-transparent display area 1304, and at least one transparent display area 1306. The transparent display area 1306 may be a window (an area devoid of LEDs on a clear circuit board) or a cutout in the LED display 1302.

As described above the primary game display may be operable to display a sequence of symbols in a symbol array having at least one column and a plurality of rows, the sequence defining a first award. The bonus game may encompass a reordering of the sequence of symbols in the symbol array. The primary game display may be operable to display a sequence of symbols in a symbol array having at least one row and a plurality of columns, the sequence defining a first award. In this embodiment the LED display may be operable to change the appearance of at least one symbol in the primary game display.

In an embodiment the LED display may be operable to highlight an area around at least one of the plurality of columns. In another embodiment the LED game display may be operable to change the appearance, such as a color, around at least one symbol in the primary game display. In a further embodiment the LED display may be operable to display a static symbol (such as a numeric symbol) or a dynamic symbol (such as a moving character) in the primary game display.

Figure 14:
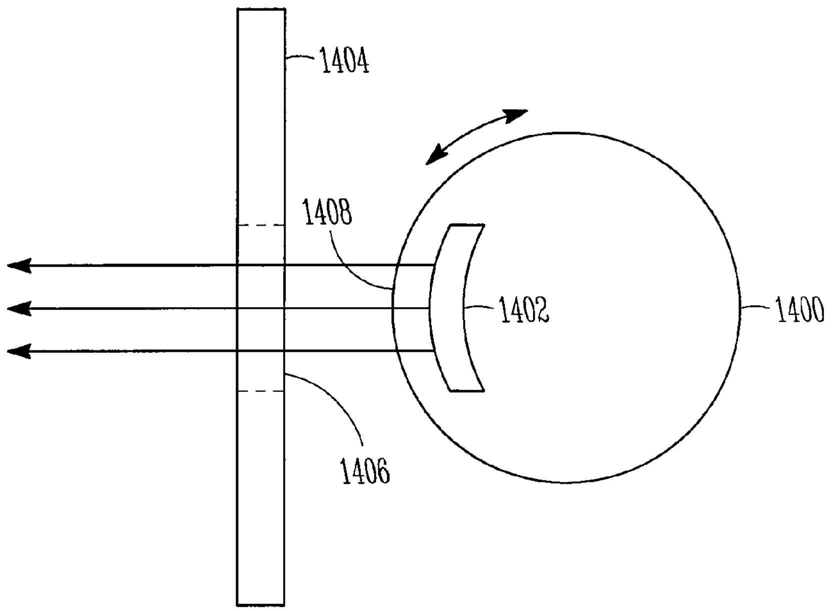
FIG. 14 depicts a back lit reel for use in an embodiment where a light source is positioned within the reel.
Figure 15:
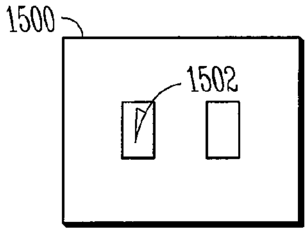
FIGS. 15-20 depict LED displays that may have different configurations of windows (clear, that is non-lit areas) or cutouts for use with different games.
Figure 16:
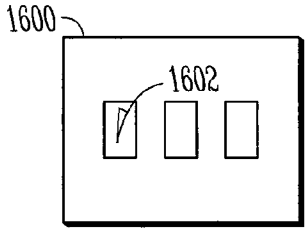
Figure 17:
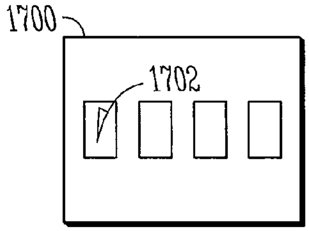
Figure 18:
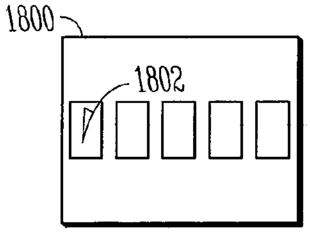
Figure 19:
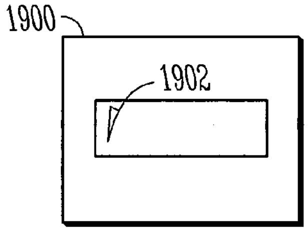
Figure 20:
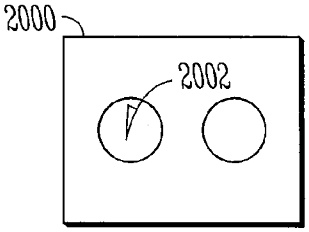

FIG. 14 depicts a back lit reel 1400 for use in an embodiment where a light source 1402 is positioned within the reel 1400. The LED display 1404 may then have at least one cutout or window 1406 in visual association with a portion 1408 of the back lit reel 1400.

FIGS. 15-20 depict LED displays 1500, 1600, 1700, 1800, 1900, 2000 that may have different configurations of windows (that is clear areas) or cutouts 1502, 1602, 1702, 1802, 1902, 2002 for use with different games. For example, the LED displays 1500, 1600, 1700, 1800 may be used with rotating reels. The LED display 1900 may be used with a curved LCD display with mechanical segmented barrier. The LED display 2000 may used with a pair of dice images. Other configurations are possible.

Figure 21:
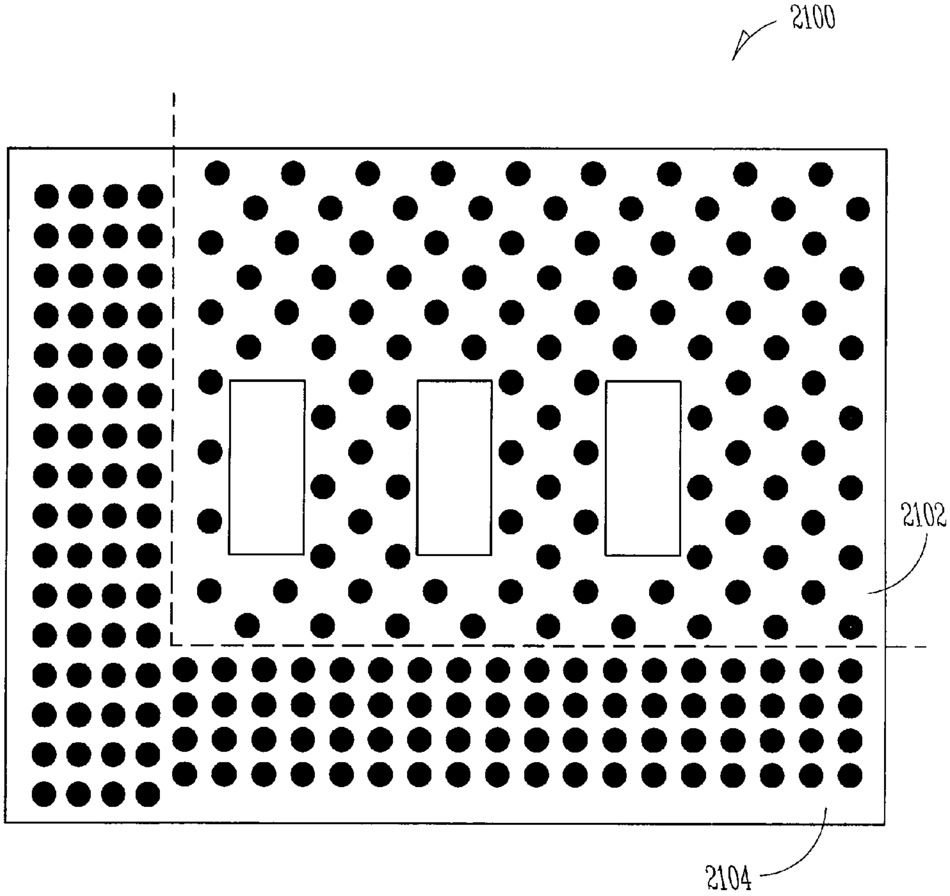
FIG. 21 depicts an LED display having different resolutions.

FIG. 21 depicts an LED display 2100 having a region 2102 that may have a density of LEDs that is different than a density of LEDs in area 2104. Each of these areas may change color, display images and messages during gameplay. For example, the color may change from a soothing blue color at the beginning of game play to a vibrant red color as the game progresses to more exciting colors. It is well known that colors affect the mood of a person, and therefore the change of colors may increase the excitement level in the player as the game progresses.

In one embodiment the area 2104 may have a resolution that is higher than a resolution of the area 2102. Such an arrangement may, for example, be used for displaying text, alphanumeric, or high resolution graphics (for example, a credit meter) along the bottom and left side of the LED display 2100. The LED display may be composed of a plurality of individual sections.

Figure 22:
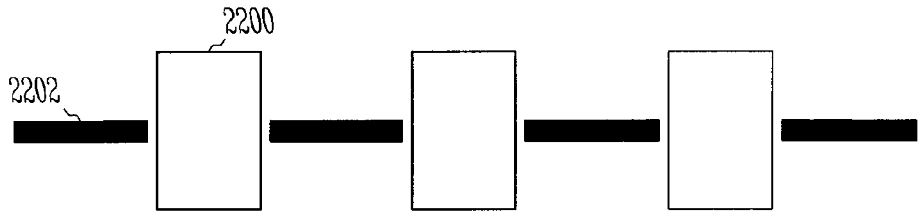
FIG. 22 (PRIOR ART)
FIG. 22 depicts a prior art pay line for a plurality of windows on a gaming machine.

FIG. 22 depicts a prior art pay line for a plurality of windows on a gaming machine. The windows 2200 allow portions of a primary game display to be viewed, and the pay line 2202 designates the area where a result symbol of the primary game display occurs.

Figure 23:
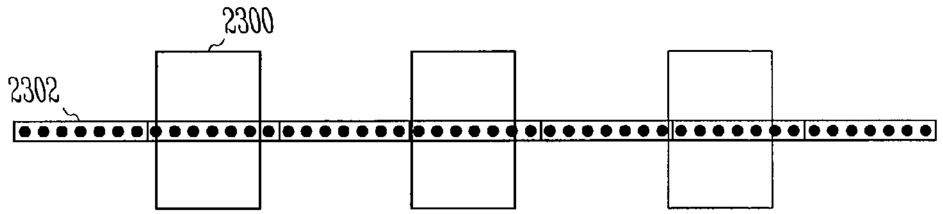
FIG. 23 depicts an LED strip as the pay line for windows in one embodiment of the present system.

FIG. 23 depicts an LED strip 2302 as the pay line for windows 2300 in one embodiment of the present system. As depicted the LED strip may be located on both sides and between the windows 2300. The strip may also run across the window itself. The prior art includes a line printed on the glass, even in the area of the symbol windows.

Figure 24:
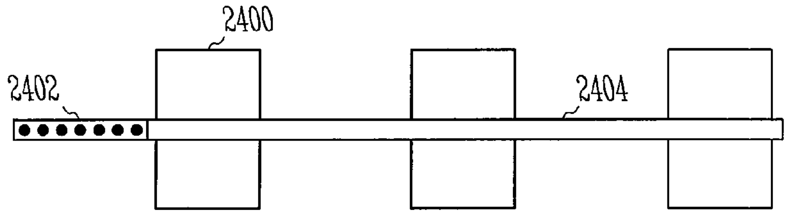
FIG. 24 depicts an LED strip operatively coupled to a light pipe as the pay line for windows in one embodiment of the present system.

FIG. 24 depicts an LED strip 2402 operatively coupled to a light pipe 2404 as the pay line for windows 2400 in one embodiment of the present system. As depicted the LED strip 2402 may be located on the left side of the windows 2400 with the light pipe 2404 positioned across and between the windows 2400.

Figure 25:
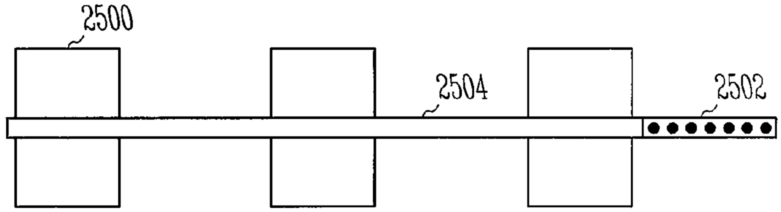
FIG. 25 depicts an LED strip operatively coupled to a light pipe as the pay line for windows in another embodiment of the present system.

FIG. 25 depicts an LED strip 2502 operatively coupled to a light pipe 2504 as the pay line for windows 2500 in another embodiment of the present system. As depicted the LED strip 2502 may be located on the right side of the windows 2500 with the light pipe 2504 positioned across and between the windows 2500.

Figure 26:
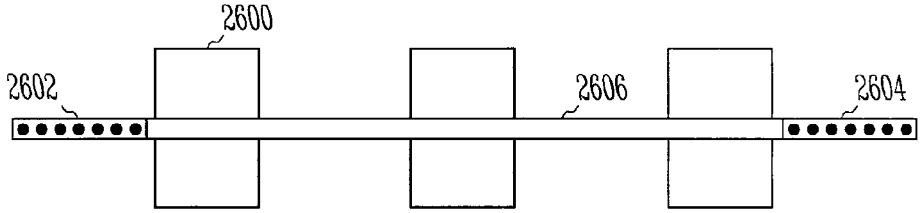
FIG. 26 depicts two LED strips operatively coupled to a light pipe as the pay line for windows in one embodiment of the present system.

FIG. 26 depicts LED strips 2602 and 2604 operatively coupled to a light pipe 2606 as the pay line for windows 2600 in one embodiment of the present system. As depicted the LED strips 2602, 2604 may be located on both sides of the windows 2600 with the light pipe 2606 positioned across and between the windows 2600.

Figure 27:
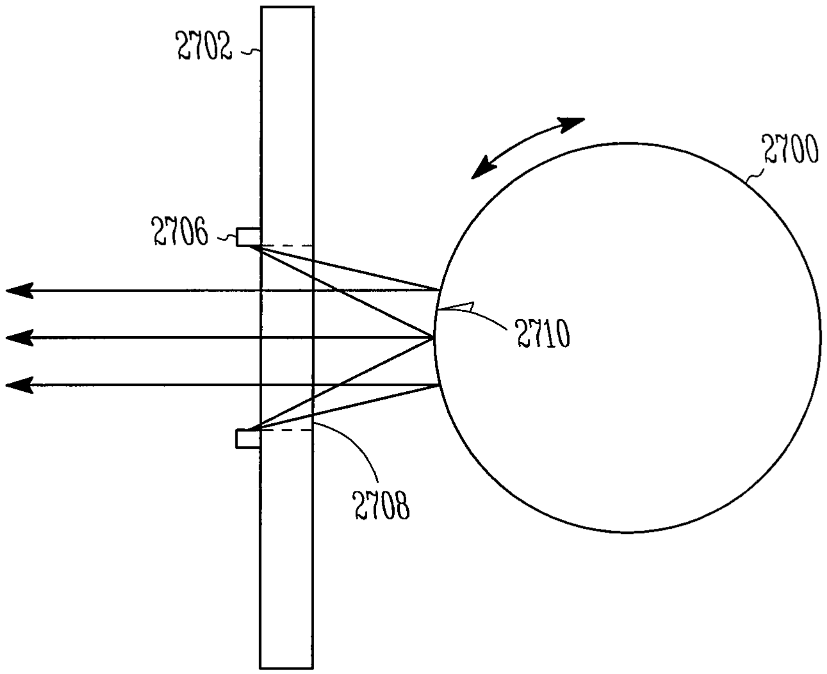
FIG. 27 depicts a reel that may be lit by LEDs on an LED display in a further embodiment of the present system.

FIG. 27 depicts a reel 2700 that may be lit by LEDs 2706 on an LED display 2702 in a further embodiment of the present system. Light from the LEDs 2706 may travel through the window 2708 in the LED display 2702 to illuminate the portion 2710 of the reel 2700. This is an alternate to the FIG. 14 embodiment.

Thus the LED display may be utilized for a variety of purposes. In some embodiments the LED display may be used for esthetic purposes wherein the LEDs create an animated image of fire, or an animated character that moves around. Such animations may or may not be associated with the game play of the gaming machine.

As the game state of the gaming machine changes during game play, the LED display may change color to represent such changes of game state. For example, one color may indicate a current basic game play state, while another color may indicate a current bonus state. Since different game play states may use different game rules, the different colors may indicate to the player what game rules are currently being used by the game machine.

The LED display may also be used to produce different changing colored areas that may be part of the game play. For example if a winning combination of three reels is the colors red, white, a greater payoff may occur if the result of changing colors on the LED display results in corresponding colors of red, white and blue in the same sequence as that of the three reels.

The LED display may produce different colors that may, for example, correspond to the time of day, the amount of a bet, the length of play, the history of play, etc. Colors may be changed to more soothing colors to relieve eye strain on a player that has been playing the game machine for an extended length of time. Also, for example, a game machine may produce a vibrant red color or create animated flames while a game machine is hot. A game machine is hot when there have been frequent and/or large payouts.

For example, the color of the LED display, or a portion thereof, may indicate the state of the game. Alternatively, the LED display may depict symbols or messages that may be either static or dynamic. The LED display may also have areas of different resolutions, as well as, depicting a variety of different pay lines.

Thus in general, the LED display may be a two-sided LED panel. The LED display may also be integrated to the game play, and may included different resolutions in different areas of the LED display. The LED display may also be located behind a colored or patterned glass.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A gaming machine comprising:

at least two gaming states;

a primary game display operable to display the outcome of a wagering game in response to a wager, the outcome includes a sequence of symbols;

an LED (light emitting diode) display overlaying the primary game display, the LED display having at least two colors respectively associated with the at least two gaming states, the LED display comprising a non-transparent display area that includes an array of LEDs, the LED display comprising a window that is devoid of LEDs and is positioned to reveal at least a portion of the outcome of the wagering game, wherein the non-transparent display area is operable to produce a graphic symbol in response to a symbol of the sequence of symbols being displayed on the primary game display and within the window of the LED display; and the LED display having a plurality of different resolution areas wherein the LED display comprises a first resolution area and a second resolution area of the plurality of different resolution areas, wherein a resolution of the first resolution area is different from a resolution of the second resolution area, and wherein the window is in the first resolution area.

2. The gaming machine claim 1, wherein the LED display emits a color of the at least two colors that is associated with a current gaming state of the at least two gaming states.

3. A gaming machine comprising:

at least two gaming states;

a primary game display operable to display the outcome of a wagering game in response to a wager;

an LED (light emitting diode) display overlaying the primary game display, the LED display having at least two colors respectively associated with the at least two gaming states, and the LED display having at least one window that is within a non-lit area of the LED display that includes an array of LEDs, and wherein the at least one window is oriented with at least a portion of the primary game display that is aligned to show the outcome of the wagering game; and the LED having a plurality of different resolution areas, wherein the LED display comprises a first resolution area and a second resolution area of the plurality of different resolution areas, wherein a resolution of the first resolution area is different from a resolution of the second resolution area, wherein the at least one window is in the first resolution area.

4. The gaming machine of claim 3, wherein the LED display emits a color of the at least two colors that is associated with a current gaming state of the at least two gaming states.

5. The gaming machine of claim 3, wherein the window is one of a cutout in the LED display and a clear area in the LED display.

6. A gaming machine comprising:

a primary game display operable to display the outcome of a wagering game in response to a wager, the primary game display operable to display a sequence of symbols in a symbol array having at least one column and a plurality of rows, the sequence defining a first award;

an LED (light emitting diode) display overlaying the primary game display, the LED display having at least one window that is within a non-lit area of the LED display that includes an array of LEDs, and wherein the at least one window is oriented with at least a portion of the primary game display so that the outcome of the wagering game on the primary game display is displayed through the window, and the LED display operable to produce at least one color that highlights the appearance in the window of at least one symbol in the primary game display that is part of the outcome of the wagering game; and the LED display having a plurality of different resolution areas, wherein the LED display comprises a first resolution area and a second resolution area of the plurality of different resolution areas, wherein a resolution of the first resolution area is different from a resolution of the second resolution area, wherein the at least one window is in the first resolution area.

7. The gaming machine of claim 6, wherein the window is one of a cutout in the LED display and a clear area in the LED display.

8. A gaming machine comprising:

a primary game display operable to display the outcome of a wagering game in response to a wager, the primary game display operable to display a sequence of symbols in a symbol array having at least one column and a plurality of rows, the sequence defining a first award;

an LED (light emitting diode) display overlaying the primary game display, the LED display having at least one window that is devoid of LEDs, and wherein the at least one window is oriented with at least a portion of the primary game display, and the LED display operable to produce at least one graphic symbol in response to an appearance in the at least one window of at least one symbol of the sequence of symbols in the primary game display that is part of the display of the outcome of the wagering game; and the LED display having a plurality of different resolution areas, wherein the LED display comprises a first resolution area and a second resolution area of the plurality of different resolution areas, wherein a resolution of the first resolution area is different from a resolution of the second resolution area, wherein the at least one window is in the first resolution area.

9. The gaming machine of claim 8, wherein the window is one of a cutout in the LED display and a clear area in the LED display.

10. The gaming machine of claim 8, wherein the primary game display is operable to display a sequence of symbols in a symbol array having at least one column and a plurality of rows, the sequence defining a first award, and wherein the gaming machine further comprises a bonus game comprising a reordering of the sequence of symbols in the symbol array, the reordered sequence defining a second award as a function of the symbols in combination with the reordered sequence.

11. The gaming machine of claim 8, wherein the LED display emits at least one of a color and an animation that is part of a current game play of the gaming machine.

12. The gaming machine of claim 8, wherein the LED display forms a pay line for the primary game display.

13. A gaming machine comprising:

a primary game display operable to display the outcome of a wagering game in response to a wager; and an LED (light emitting diode) display overlaying the primary game display and having a plurality of different resolution areas, wherein the LED display comprises a first resolution area and a second resolution area of the plurality of different resolution areas, wherein a resolution of the first resolution area is different from a resolution of the second resolution area, wherein at least one window is in the first resolution area, the at least one window oriented with at least a portion of the primary game display so that the outcome of the wagering game on the primary game display is displayed through the at least one window.

14. The gaming machine of claim 13, wherein the second resolution area is to display at least one of alphanumeric data or a graphic symbol.

15. The gaming machine of claim 14, wherein the display in the second resolution area is altered in response to the outcome displayed through the window in the first resolution area.

16. The gaming machine of claim 14, wherein the second resolution area of the plurality of different resolution areas has a higher resolution in comparison to the first resolution area.

17. The gaming machine of claim 14, wherein the second resolution area displays a credit meter of the gaming machine.

* * * * *